US012598628B2

(12) United States Patent
Wang

(10) Patent No.: US 12,598,628 B2
(45) Date of Patent: Apr. 7, 2026

(54) METHOD AND APPARATUS FOR TRANSMITTING MBS SERVICE, AND TERMINAL DEVICE

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 348 days.

(21) Appl. No.: 18/203,793

(22) Filed: May 31, 2023

(65) Prior Publication Data

US 2023/0309121 A1 Sep. 28, 2023

Related U.S. Application Data

(63) Continuation of application No. PCT/CN2020/140989, filed on Dec. 29, 2020.

(51) Int. Cl.
*H04W 72/30* (2023.01)
*H04W 72/23* (2023.01)

(52) U.S. Cl.
CPC ........... *H04W 72/30* (2023.01); *H04W 72/23* (2023.01)

(58) Field of Classification Search
CPC ....... H04W 72/30; H04W 72/23; H04W 4/06; H04W 56/001; H04W 76/28; H04L 5/005; H04L 5/0053; Y02D 30/70

USPC .......................................................... 370/312
See application file for complete search history.

(56) References Cited

U.S. PATENT DOCUMENTS

| | | | | |
|---|---|---|---|---|
| 2022/0131656 A1* | 4/2022 | Lee | ...................... | H04L 1/1825 |
| 2022/0353710 A1* | 11/2022 | Yoshioka | ............... | H04W 4/06 |
| 2024/0057100 A1* | 2/2024 | Agiwal | .................. | H04W 4/06 |

FOREIGN PATENT DOCUMENTS

| | | |
|---|---|---|
| CN | 110650533 A | 1/2020 |
| CN | 111464279 A | 7/2020 |
| CN | 111935807 A | 11/2020 |
| JP | 2019134422 A | 8/2019 |
| WO | 2018028500 A1 | 2/2018 |
| WO | 2019214661 A1 | 11/2019 |
| WO | 2022131622 A1 | 6/2022 |

OTHER PUBLICATIONS

Extended European Search Report issued in corresponding European application No. 20967436.5, mailed Dec. 5, 2023.

(Continued)

*Primary Examiner* — Rownak Islam
(74) *Attorney, Agent, or Firm* — BAYES PLLC

(57) ABSTRACT

Provided in the embodiments of the present application are a method and apparatus for transmitting an MBS service, and a terminal device. The method comprises: a terminal device determines a correspondence between a physical downlink control channel (PDCCH) occasion and a synchronization signal block (SSB) index, wherein the PDCCH occasion is used for transmitting an MBS PDCCH; and the terminal device receives the MBS PDCCH on the basis of the correspondence between the PDCCH occasion and the SSB index.

20 Claims, 16 Drawing Sheets

The terminal device determines the corresponding relationship between the PDCCH opportunity and the SSB index, and the PDCCH opportunity is used to transmit the MBS PDCCH — 501

The terminal device receives the MBS PDCCH based on the correspondence between the PDCCH opportunity and the SSB index — 502

(56) References Cited

OTHER PUBLICATIONS

Source: CATT; Title: Discussion on group scheduling mechanism for RRC_Connected UEs in MBS 3GPP TSG RAN WG1 Meeting #103-e R1-2007835 e-Meeting, Oct. 26-Nov. 13, 2020.

Source: ZTE; Title: Basic Functions for Broadcast/Multicast for RRC_Idle/Inactive UEs 3GPP TSG RAN WG1 #103-e R1-2008828 e-Meeting, Oct. 26-Nov. 13, 2020.

Notice of Allowance issued in corresponding European Application No. 20967436.5, mailed Aug. 9, 2024, 79 pages.

Notice of Priority Examination of Patent Application issued in corresponding Chinese Application No. 202080106967.1, mailed Sep. 19, 2024, 6 pages.

The First Office Action issued in corresponding Chinese Application No. 202080106967.1, mailed Sep. 26, 2024, 23 pages.

"Feature lead summary #1 on RAN basic functions for broadcast/multicast for UEs in RRC_Idle/ RRC_Inactive states", Agenda item: 8.12.3, Source: Moderator (BBC), 3GPP TSG RAN WG1 #105-e, R1-2105993, e-Meeting, May 10-27, 2021, 41 pages.

"On supporting the short periodicity of SSB measurement for Idle/Inactive UE", Agenda Item: 11.20.1, Souce: Samsung, 3GPP TSG-RAN WG2 Meeting #107, R2-1911451, Prague, Czech Republic, Aug. 26-30, 2019, 10 pages.

CATT, "Discussion on group scheduling mechanism for RRC_Connected UEs in MBS", R1-2005693, 3GPP TSG RAN WG1 Meeting #102-e e-Meeting, Aug. 17-28, 2020.

CMCC, "Discussion on NR MBS in RRC_Idle RRC_Inactive states", R1-2006235, 3GPP TSG RAN WG1 #102-e e-Meeting, Aug. 17-28, 2020.

CMCC, "Discussion on NR MBS in RRC_Idle/RRC_Inactive states", R1-2008036, 3GPP TSG RAN WG1 #103-e e-Meeting, Oct. 26-Nov. 13, 2020.

Vivo, "Discussion on basic functions for broadcast/multicast for RRC_Idle/RRC_Inactive UEs", R1-2007693, 3GPP TSG RAN WG1 #103-e E-Meeting, Oct. 26-Nov. 13, 2020.

OPPO, "Discussion on MBS reception of idle or inactive mode UE", R2-2008869, 3GPP TSG-RAN WG2 Meeting #112 electronic Online, Nov. 2-13, 2020.

International Search Report issued in international application No. PCT/CN2020/140989, mailed Sep. 28, 2021.

Written Opinion of the International Searching Authority issued in international application No. PCT/CN2020/140989, mailed Sep. 28, 2021.

3GPP TS 38.304 V16.2.0 (Sep. 2020); Technical Specification Group Radio Access Network; NR; User Equipment (UE) procedures in Idle mode and RRC Inactive state (Release 16).

Huawei, "New Work Item on NR support of Multicast and Broadcast Services", RP-193248, 3GPP TSG RAN Meeting #86 Sitges, Spain, Dec. 9-12, 2019.

* cited by examiner

100

110

120    120

Beam sweeping

501

The terminal device determines the corresponding relationship between the PDCCH opportunity and the SSB index, and the PDCCH opportunity is used to transmit the MBS PDCCH

502

The terminal device receives the MBS PDCCH based on the correspondence between the PDCCH opportunity and the SSB index

METHOD AND APPARATUS FOR TRANSMITTING MBS SERVICE, AND TERMINAL DEVICE

CROSS-REFERENCE TO RELATED APPLICATION

The present application is a continuation of International Application No. PCT/CN2020/140989, filed on Dec. 29, 2020, which is incorporated herein by reference in its entirety.

TECHNICAL FIELD

The embodiments of the present application relate to the technical field of mobile communication, and in particular to a method, an apparatus, and a terminal device for transmitting a Multicast Broadcast Service (MBS) service.

BACKGROUND

In the New Radio (NR) system, broadcast-type MBS services are supported, and terminal devices can receive the broadcast MBS service in the Radio Resource Control (RRC) idle state or in the RRC inactive state or in the RRC connected state.

In the NR system, the broadcast MBS service can be transmitted on the air interface in a beam sweeping manner.

SUMMARY

Embodiments of the present application provide an MBS service transmission method, an apparatus, and a terminal device.

The MBS service transmission method provided by the embodiments of the present application includes:

determining, by a terminal device, a correspondence between a physical downlink control channel (PDCCH) opportunity and a synchronization signal block (SS/PBCH Block, SSB) index, and the PDCCH opportunity is used to transmit an MBS PDCCH; and receiving, by the terminal device, the MBS PDCCH based on the correspondence between the PDCCH opportunity and the SSB index.

An MBS service transmission apparatus provided by the embodiments of the present application, applied to a terminal device, includes:

a determining unit, used to determine a correspondence between a PDCCH opportunity and an SSB index, and the PDCCH opportunity is used to transmit an MBS PDCCH; and a receiving unit, used to receive the MBS PDCCH based on the correspondence between the PDCCH opportunity and the SSB index.

A terminal device provided by the embodiments of the present application includes a processor and a memory. The memory is used to store a computer program, and the processor is used to call and run the computer program stored in the memory to execute the above MBS service transmission method.

A chip provided by the embodiments of the present application is used to implement the above MBS service transmission method.

In particular, the chip includes a processor used to call and run a computer program from a memory, so that a device equipped with the chip executes the above MBS service transmission method.

A computer-readable storage medium provided by the embodiments of the present application is used for storing a computer program, and the computer program causes a computer to execute the above MBS service transmission method.

A computer program product provided by the embodiments of the present application includes computer program instructions, and the computer program instructions cause a computer to execute the above MBS service transmission method.

A computer program provided by the embodiments of the present application, when running on a computer, enables the computer to execute the above MBS service transmission method.

BRIEF DESCRIPTION OF THE DRAWINGS

The drawings described here are used to provide a further understanding of the application and constitute a part of the application. The schematic embodiments and descriptions of the application are used to explain the application and do not constitute an improper limitation to the application. In the drawings.

DETAILED DESCRIPTION

The technical solutions in the embodiments of the present application will be described below with reference to the drawings in the embodiments of the present application. Obviously, the described embodiments are part of the embodiments of the present application, but not all of the embodiments. Based on the embodiments in this application, all other embodiments obtained by persons of ordinary skill in the art without making creative efforts belong to the scope of protection of this application.

The technical solution of the embodiment of the present application can be applied to various communication systems, for example: Long Term Evolution (LTE) system, LTE Frequency Division Duplex (FDD) system, LTE Time Division Duplex (TDD), systems, 5G communication systems or future communication systems, etc.

Figures 1, 2:
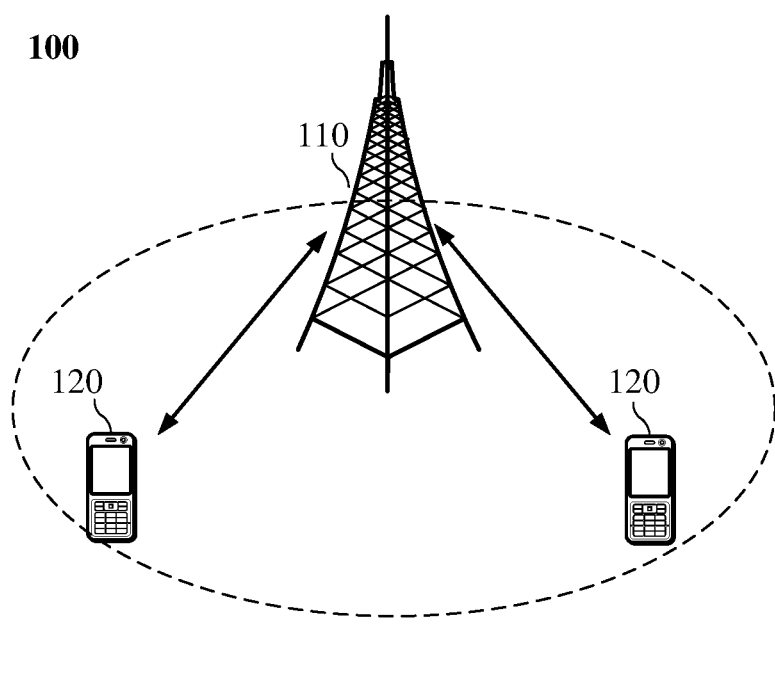
FIG. 1 is a schematic diagram of a communication system architecture provided by an embodiment of the present application.
FIG. 2 is a schematic diagram of beam sweeping provided by an embodiment of the present application.

Exemplarily, a communication system 100 applied in this embodiment of the application is shown in FIG. 1. The communication system 100 may include a network device 110, and the network device 110 may be a device for communicating with a terminal 120 (or referred to as a communication terminal, terminal). The network device 110 can provide communication coverage for a specific geographic area, and can communicate with terminals located in the coverage area. Optionally, the network device 110 may be an evolutional base station (Evolutional Node B, eNB or eNodeB) in an LTE system, or a wireless controller in a cloud radio access network (CRAN), or the network device may be a mobile switching center, a relay station, an access point, a vehicle-mounted device, a wearable device, a hub, a switch, a bridge, a router, a network-side device in a 5G network, or a network device in a future communication system.

The communications system 100 further includes at least one terminal 120 located inside a coverage area of the network device 110. The "terminal" used herein includes, but is not limited to a device that is configured to receive/transmit communication signals via a wired connection, such as via a public switched telephone network (PSTN), digital subscriber line (DSL), digital cable, direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another terminal; and/or an Internet of Things (IoT) device. A terminal configured to communicate through a wireless interface may be referred to as a "wireless communications terminal", "wireless terminal" or "mobile terminal". Examples of the mobile terminal include, but are not limited to, a satellite or a cellular telephone; a personal communications system (PCS) terminal that may combine a cellular radiotelephone with data processing, facsimile and data communication capabilities; a personal digital assistant (PDA) that can include a radiotelephone, a pager, Internet/Intranet access, a web browser, a notepad, a calendar, and/or a global positioning system (GPS) receiver; and a conventional laptop and/or palmtop receiver or another electronic device that includes a radiotelephone transceiver. A terminal may be an access terminal, user equipment (User Equipment, UE), a subscriber unit, a subscriber station, a mobile station, a mobile, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN or the like.

Optionally, direct device to device (Device to Device, D2D) communication may be performed between terminals 120.

Optionally, the 5G communication system or the 5G network may also be called a New Radio (New Radio, NR) system or an NR network.

FIG. 1 exemplarily shows a network device and two terminals. Optionally, the communication system 100 may include multiple network devices and each network device may include other numbers of terminals within the coverage area of the present application, which is not limited by the embodiment of the present application.

Optionally, the communication system 100 may further include other network entities such as a network controller and a mobility management entity, which is not limited in this embodiment of the present application.

It should be understood that a device with a communication function in the network/system in the embodiment of the present application may be referred to as a communication device. Taking the communication system 100 shown in FIG. 1 as an example, the communication device may include a network device 110 and a terminal 120 with a communication function, and the network device 110 and the terminal 120 may be the specific devices described above, which will not be repeated here. The communication device may also include other devices in the communication system 100, such as network controllers, mobility management entities and other network entities, which are not limited in this embodiment of the present application.

It should be understood that the terms "system" and "network" are often used interchangeably herein. The term "and/or" in this article is just an association relationship describing associated objects, which means that there can be three relationships, for example, A and/or B can mean the three cases of: A exists alone, A and B exist simultaneously, and B exists alone. In addition, the character "I" in this article generally indicates that the contextual objects are an "or" relationship.

To facilitate understanding of the technical solutions of the embodiments of the present application, the following describes the technical solutions related to the embodiments of the present application.

With people's pursuit of speed, delay, high-speed mobility, energy efficiency, and the diversity and complexity of service in future life, the 3rd Generation Partnership Project (3GPP) international standards organization began to develop 5G. The main application scenarios of 5G are enhanced Mobile Broadband (eMBB), Ultra-Reliable Low- Latency Communications (URLLC), massive Machine-Type Communications (mMTC).

On the one hand, eMBB still aims at users obtaining multimedia content, services and data, and its demand is growing rapidly. On the other hand, since eMBB may be deployed in different scenarios, such as indoors, urban areas, and rural areas, the capabilities and requirements vary greatly, so it cannot be generalized, and detailed analysis must be combined with specific deployment scenarios. Typical applications of URLLC include: industrial automation, power automation, telemedicine operations (surgery), traffic safety assurance, etc. The typical characteristics of mMTC include: high connection density, small data volume, delay-insensitive services, low cost and long service life of modules, etc.

In the early deployment of NR, it is difficult to obtain complete NR coverage, so the typical network coverage is wide-area LTE coverage and NR island coverage mode. Moreover, a large number of LTE deployments are below 6 GHz, and there is very little spectrum below 6 GHz that can be used for 5G. Therefore, NR must study the spectrum application above 6 GHz, while the coverage of high frequency bands is limited and the signal fades quickly. At the same time, in order to protect mobile operators' investment in LTE in the early stage, a working mode of tight inter-working between LTE and NR is proposed.

RRC State

In order to reduce air interface signaling, quickly restore wireless connections, and quickly restore data services, 5G defines a new Radio Resource Control (RRC) state, that is, RRC_INACTIVE state. This state is different from RRC idle (RRC_IDLE) state and RRC active (RRC_ACTIVE) state. Wherein, 1) RRC_IDLE state (abbreviated as idle state): Mobility is UE-based cell selection and reselection, paging is initiated by the core network (CN), and the paging area is configured by the CN. There is no UE context and no RRC connection at the base station side.

2) RRC_CONNECTED state (abbreviated as connected state): There is an RRC connection, and UE context exists on the base station side and the UE side. The network side knows the location of the UE at the specific cell level. Mobility is mobility controlled by the network side. Unicast data can be transmitted between the UE and the base station.

3) RRC_INACTIVE state (abbreviated as inactive state): Mobility is UE-based cell selection and reselection, there is a connection between CN-NR, UE context exists on a certain base station, paging is triggered by RAN, the paging area based on the RAN is managed by the RAN, and the network side knows the location of the UE based on the paging area level of the RAN.

Beam Sweeping

Figure 3:
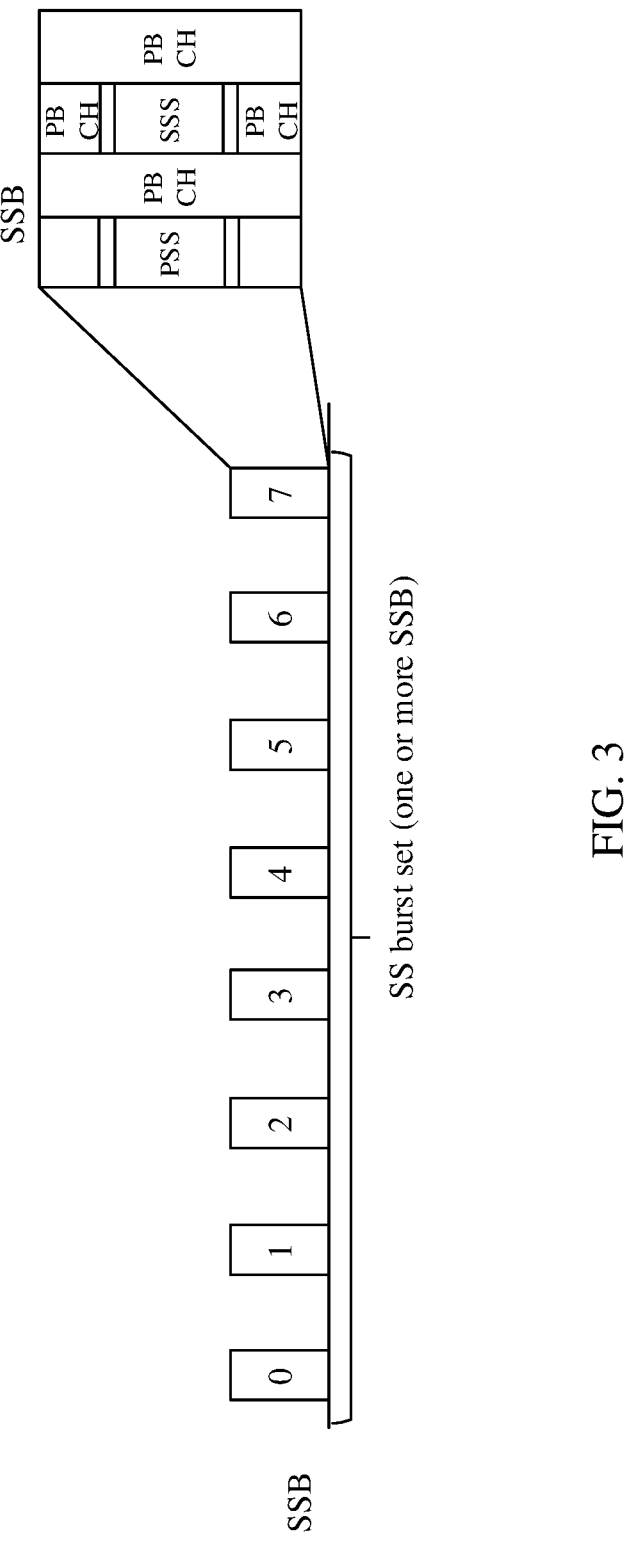
FIG. 3 is a schematic diagram of the SSB provided by an embodiment of the present application.
Figure 4:
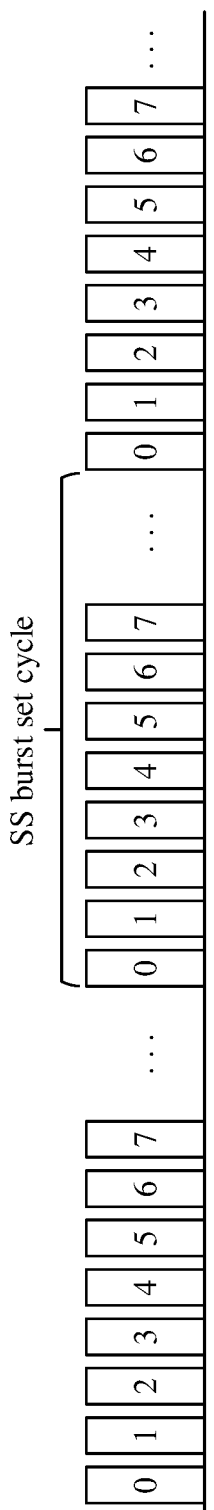
FIG. 4 is a schematic diagram of the SSB burst set cycle provided by an embodiment of the present application.

NR will be deployed on high frequencies in the future. In order to improve coverage, in 5G, the mechanism of beam sweeping is introduced to meet the coverage requirements (use space for coverage and time for space), as shown in FIG. 2. After the introduction of beam sweeping, synchronization signals need to be sent in each beam direction. 5G synchronization signals are given in the form of SSB, including primary synchronization signals (PSS), secondary synchronization signals (SSS), and a physical broadcast channel (PBCH), as shown in FIG. 3. The 5G synchronization signal appears periodically in the time domain in the form of a synchronization signal burst set (SS burst set), as shown in FIG. 4.

Multimedia Broadcast Multicast Service (MBMS)

MBMS is a technology that transmits data from one data source to multiple terminal devices by sharing network resources. This technology can effectively use network resources while providing multimedia services, and realize high-speed (such as 256 kbps) broadcast and multicast of multimedia services.

Due to the low spectrum efficiency of MBMS, it is not enough to effectively carry and support the operation of mobile TV services. Therefore, in LTE, 3GPP clearly proposed to enhance the ability to support the downlink high-speed MBMS service, and determined the design requirements for the physical layer and the air interface.

3GPP R9 introduces evolved MBMS (eMBMS) into LTE. The eMBMS proposes the concept of Single Frequency Network (SFN), that is, Multimedia Broadcast Multicast Service Single Frequency Network (MBSFN). MBSFN uses a unified frequency to transmit service data in all cells at the same time, with the premise to ensure the synchronization between cells. This method can greatly improve the overall signal-to-noise ratio distribution of the cell, and the spectrum efficiency will also be greatly improved accordingly. The eMBMS implements broadcast and multicast of services based on the IP multicast protocol.

In LTE or LTE-Advanced (LTE-A), MBMS only has a broadcast bearer mode, but no multicast bearer mode. In addition, the reception of the MBMS service is applicable to the terminal device in the idle state or connected state.

3GPP R13 introduces the single cell point to multipoint (SC-PTM) concept, and the SC-PTM is based on the MBMS network architecture.

MBMS introduces new logical channels, including Single Cell-Multicast Control Channel (SC-MCCH) and Single Cell-Multicast Transport Channel (SC-MTCH). The SC-MCCH and the SC-MTCH are mapped to a downlink-shared channel (DL-SCH), and further, the DL-SCH is mapped to a physical downlink-shared channel (PDSCH), wherein SC-MCCH and SC-MTCH belong to logical channels, DL-SCH belongs to transmission channels, and PDSCH belongs to physical channels. SC-MCCH and SC-MTCH do not support hybrid automatic repeat request (HARQ) operation.

MBMS introduces a new system information block (SIB) type, namely SIB20. Specifically, SIB20 is used to transmit SC-MCCH configuration information, and one cell has only one SC-MCCH. The SC-MCCH configuration information includes: SC-MCCH modification period, SC-MCCH repetition period, and information such as radio frames and subframes for scheduling SC-MCCH. Further, 1) The boundary of the modification period of SC-MCCH satisfies SFN mod m=0, where SFN represents the system frame number of the boundary, and m is the modification period of SC-MCCH configured in SIB20 (i.e., sc-mcch-ModificationPeriod). 2) The wireless frame for scheduling the SC-MCCH satisfies: SFN mod mcch-RepetitionPeriod=mcch-Offset, wherein SFN represents the system frame number of the wireless frame, mcch-RepetitionPeriod represents the repetition period of SC-MCCH, and mcch-Offset represents SC-MCCH offset. 3) The subframe for scheduling the SC-MCCH is indicated by sc-mcch-Subframe.

The SC-MCCH is scheduled through a physical downlink control channel (PDCCH). On the one hand, a new radio network temporary identity (RNTI), that is, a single cell RNTI (SC-RNTI) is introduced to identify the PDCCH used to schedule the SC-MCCH (such as the SC-MCCH PDCCH). Optionally, the SC-RNTI has a fixed value of FFFC. On the other hand, a new RNTI is introduced, that is, a single cell notification RNTI (SC-N-RNTI) to identify the PDCCH used to indicate the change notification of the SC-MCCH (such as notifying the PDCCH). Optionally, the SC-N-RNTI has a fixed value of FFFB. Further, one of the 8 bits (bits) of DCI 1C can be used to indicate the change notification. In LTE, SC-PTM configuration information is based on SC-MCCH configured by SIB20, and then SC-MCCH configures SC-MTCH, and SC-MTCH is used to transmit service data.

Specifically, the SC-MCCH only transmits a message (namely SCPTMConfiguration), which is used to configure configuration information of the SC-PTM. The configuration information of the SC-PTM includes: Temporary Mobile Group Identity (TMGI), session ID, group RNTI (G-RNTI), discontinuous reception (DRX) configuration information, and the SC-PTM service information of the neighboring cell, etc. It should be noted that the SC-PTM in R13 does not support the Robust Header Compression (ROHC) function.

The downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, start the timer onDurationTimerSCPTM;

When downlink PDCCH scheduling is received, start timer drx-InactivityTimerSCPTM;

SC-PTM service is received only when the timer onDurationTimerSCPTM or drx-InactivityTimerSCPTM is running.

SC-PTM service continuity adopts the concept of MBMS service continuity based on SIB15, that is, "SIB15+MBMSInterestIndication" mode. The service continuity of terminal device in idle state is based on the concept of frequency priority.

According to the above description, it can be known that the configuration of SC-PTM is to configure SC-MCCH based on SIB20, and then configure SC-MTCH based on SC-MCCH. There is one and only one SC-MCCH in a cell, that is to say, the terminal device needs to re-obtain the SC-MCCH after performing cell reselection, which will cause service interruption.

In the NR system, many scenarios need to support multicast and broadcast service requirements, such as in the Internet of Vehicles and the Industrial Internet. So it is necessary to introduce MBMS in NR.

It should be noted that the MBMS service in the above solution includes but not limited to multicast service, broadcast service, MBS service and so on. The embodiment of the present application takes the MBS service as an example for illustration, and the description of "MBS service" may also be replaced with "multicast service" or "groupcast service" or "broadcast service" or "MBMS service".

In the NR system, the broadcast type MBS service is supported, and the terminal device can receive the broadcast MBS service in the RRC idle state, the RRC inactive state or the RRC connected state.

In the NR system, the broadcast MBS service can be transmitted on the air interface in the form of beam sweeping. To transmit the broadcast MBS service in the beam sweeping mode, it needs to associate the association relationship (that is, the corresponding relationship) between the MBS PDCCH and the SSB index (SSB index), so that the terminal device can correctly receive the broadcast MBS service. To this end, the following technical solutions of the embodiments of the present application are proposed.

In the technical solution of the embodiment of this application, a new SIB (referred to as the first SIB) is defined. The first SIB includes the configuration information of the first MCCH. Here, the first MCCH is the control channel of the MBS service. In other words, the first SIB is used to configure the configuration information of the control channel of the NR MBS. Optionally, the control channel of the NR MBS may also be referred to as the NR MCCH (that is, the first MCCH).

Further, the first MCCH is used to carry the first signaling. The embodiment of the present application does not limit the name of the first signaling. For example, the first signaling is signaling A, and the first signaling includes at least one first MTCH configuration information, here, the first MTCH is a traffic channel of the MBS service (also referred to as a data channel or a transmission channel), and the first MTCH is used to transmit MBS service data (such as NR MBS service data). In other words, the first MCCH is used to configure the configuration information of the traffic channel of the NR MBS. Optionally, the traffic channel of the NR MBS may also be referred to as the NR MTCH (that is, the first MTCH).

Specifically, the first signaling is used to configure the traffic channel of the NR MBS, the traffic information corresponding to the traffic channel, and the scheduling information corresponding to the traffic channel. Further, optionally, the service information corresponding to the service channel, such as TMGI, session id and other identification information for identifying services. The scheduling information corresponding to the traffic channel, for example, the RNTI used when the MBS service data corresponding to the traffic channel is scheduled, such as G-RNTI, DRX configuration information, and the like.

It should be noted that both the transmission of the first MCCH and the first MTCH are scheduled based on the PDCCH. Wherein, the RNTI used by the PDCCH for scheduling the first MCCH uses a network-wide unique identifier, that is, a fixed value. The RNTI used by the PDCCH for scheduling the first MTCH is configured through the first MCCH.

It should be noted that, in this embodiment of the present application, there is no restriction on naming of the first SIB, the first MCCH, and the first MTCH. For ease of description, the first SIB may also be abbreviated as SIB, the first MCCH may also be abbreviated as MCCH, and the first MTCH may also be abbreviated as MTCH. The SIB is used to configure the PDCCH used to schedule the MCCH (that is, the MCCH PDCCH) and notify the PDCCH, wherein the DCI carried by the MCCH PDCCH is used to schedule the PDSCH used to transmit the MCCH (that is, the MCCH PDSCH). Further, M PDCCHs for scheduling MTCHs (that is, MTCH 1 PDCCH, MTCH 2 PDCCH, . . . , MTCH M PDCCH) are configured through the MCCH, wherein the DCI carried by MTCH n PDCCH is used to schedule the PDSCH for transmitting MTCH n (i.e., MTCH n PDSCH), n is an integer greater than or equal to 1 and less than or equal to M. MCCH and MTCH are mapped to DL-SCH, and further, DL-SCH is mapped to PDSCH, wherein MCCH and MTCH belong to logical channels, DL-SCH belongs to transmission channel, and PDSCH belongs to physical channel.

Figure 5:
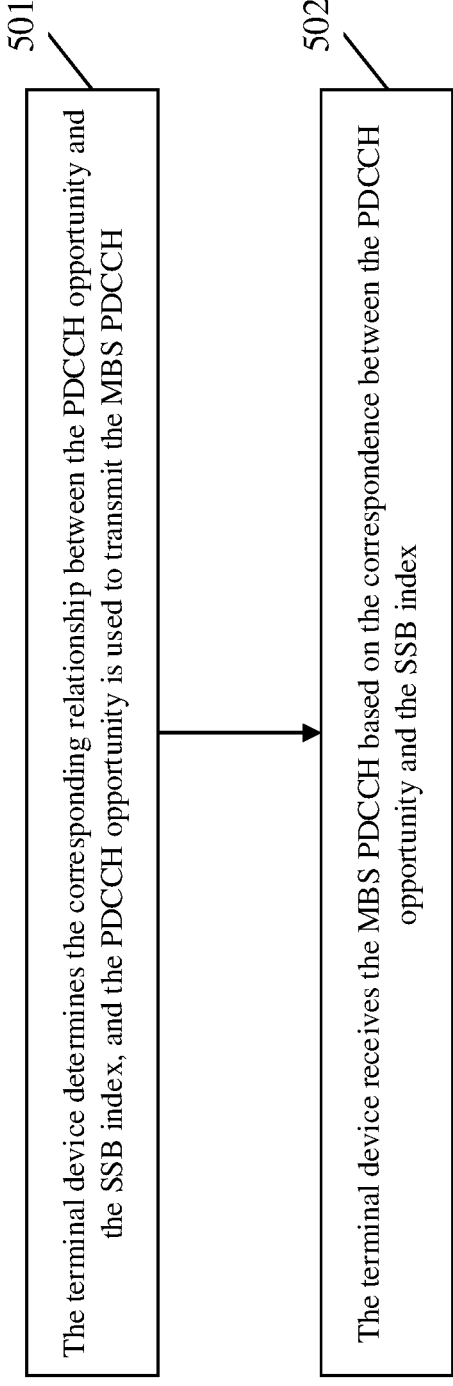
FIG. 5 is a schematic flowchart of a method for transmitting an MBS service provided in an embodiment of the present application.

FIG. 5 is a schematic flow chart of the transmission method of the MBS service provided by the embodiment of the present application. As shown in FIG. 5, the transmission method of the MBS service includes the following steps:

Step 501: The terminal device determines the corresponding relationship between the PDCCH opportunity and the SSB index, and the PDCCH opportunity is used to transmit the MBS PDCCH.

Step 502: The terminal device receives the MBS PDCCH based on the correspondence between the PDCCH opportunity and the SSB index.

In the embodiment of the present application, the PDCCH opportunity is used to transmit the MBS PDCCH, and the MBS PDCCH is used to schedule the transmission of the MBS service, or in other words, the MBS PDCCH is used to carry the scheduling information of the transmission of the MBS service. In an optional manner, the MBS PDCCH may be the MCCH PDCCH in the above solution, or the notification PDCCH, or the MTCH PDCCH.

It should be noted that the PDCCH opportunity in the embodiment of the present application may also be referred to as a PDCCH monitor occasion.

In the embodiment of the present application, the MBS service is transmitted in a beam sweep manner, and optionally, the MBS service is transmitted in a broadcast manner. In order to ensure that the terminal device correctly receives the MBS service, it needs to correctly receive the MBS PDCCH that schedules the transmission of the MBS service. Therefore, it is necessary to determine the corresponding relationship between the PDCCH opportunity and the SSB.

In the embodiment of the present application, before determining the correspondence between the PDCCH opportunities and the SSBs, it is needed to determine how the PDCCH opportunities are numbered (that is, the index of the PDCCH opportunities needs to be determined). To this end, the terminal device acquires first configuration information, and the first configuration information is used to determine a first time window; wherein, within the first time window, the PDCCH opportunities corresponding to the MBS service are numbered from 0.

Here, the first configuration information is defined by the protocol; or, the first configuration information is configured by the network device through the MCCH; or, the first configuration information is configured by the network device through a system broadcast message (such as SIB).

Several manners of numbering the PDCCH opportunities are given below.

Manner A: The first configuration information includes first indication information, and the first indication information is used to determine the length and/or period of the first time window, and to determine the starting position of the first time window.

In an optional manner, the first indication information is used to indicate K, K is a positive integer greater than or equal to 1; the length of the first time window is K radio frames; the wireless frame where the starting position of the first time window is located satisfies the following formula: SFN mod K=0, wherein SFN represents a serial number of the wireless frame where the starting position of the first time window is located, and mod represents a remainder operation.

Here, K can be set by protocol. Or, K may be configured by a network device, for example, configured by SIB or MCCH. For the PDCCH opportunities of the MBS service, starting from the radio frame with SFN mod K=0, the PDCCH opportunities in K radio frames are numbered from 0.

Manner B: The first configuration information includes first indication information and second indication information, the first indication information is used to determine the length and/or period of the first time window, and the second indication information is used to determine a starting position of the first time window.

In an optional manner, the first indication information is used to indicate T, and T is a positive integer greater than or equal to 1; the second indication information is used to indicate an offset value (offset); the length of the first time window is T radio frames; at least one of the radio frame, subframe, time slot and symbol where the starting position of the first time window is determined based on the offset.

Here, the network device may configure configuration information of the time window, the configuration information of the time window includes first indication information and second indication information, and the first indication information is used to indicate that the length and/or period of the first time window is T, the second indication information is used to indicate the offset of the first time window, through which the starting position of the first time window can be determined.

In this embodiment of the present application, the granularity for determining the starting position of the first time window may be radio frame granularity (i.e., SFN granularity), or subframe granularity, or time slot granularity, or symbol granularity.

In an example, taking the SFN granularity as an example, the wireless frame where the starting position of the first time window is located satisfies the following formula:

$$\text{SFN mod } T\text{=offset;}$$

wherein, SFN represents a serial number of the radio frame where the starting position of the first time window is located, and mod represents a remainder operation.

In an example, taking a subframe as an example, the radio frame and the subframe where the starting position of the first time window is located satisfy the following formulas:

$$\text{SFN mod } T\text{=floor(offset/10);}$$

$$\text{subframe}=o\ \text{offset mod 10;}$$

wherein, SFN represents a serial number of the wireless frame where the starting position of the first time window is located, subframe represents a serial number of the subframe where the starting position of the first time window is located, mod represents a remainder operation, and floor represents downward rounding operation.

Manner C: the first configuration information includes DRX configuration information, the DRX configuration information is used to determine the DRX cycle, the DRX cycle includes a first time period and a second time period, and the first time period is the time period where the DRX activation time is located, and the second time period is the time period where the DRX inactivation time is located; the first time window is the first time period; or, the first time window is the DRX cycle.

Here, the network device may configure DRX configuration information, and the DRX configuration information is used to determine the DRX cycle, and is further used to determine the first time period and the second time period in the DRX cycle. Wherein, the first time period is the time period where the DRX activation time is located, and the first time period may also be referred to as DRX on duration; the time period other than the first time period in the DRX cycle is the second time period, and the second time period is the time period where the DRX inactivation time is located. It should be noted that the terminal device needs to monitor the MBS PDCCH at a PDCCH opportunity in the first time period. For the PDCCH opportunity of the MBS service, the PDCCH opportunity is numbered from 0 from the starting moment of the first time period until entering the DRX inactivation moment (that is, the starting moment of the second time period) or until the start moment of the next first time period where the numbering is stopped.

In the embodiment of the present application, after the PDCCH opportunities in the first time window are numbered through the above scheme, the index of the first PDCCH opportunity in the first time window is 0, the index of the second PDCCH opportunity is 1, and so on. Based on the indexes of each PDCCH opportunity in the first time window, the corresponding relationship between the PDCCH opportunity and the SSB index can be determined in any of the following manners.

Manner 1

1) Case 1

For the n-th MBS data in the first time window, the index of the PDCCH opportunity corresponding to the k-th actually transmitted SSB is:

$(n-1)*S+(k-1)$;

wherein, n is a positive integer greater than or equal to 1 and less than or equal to N, k is a positive integer greater than or equal to 1 and less than or equal to S; S is the number of SSBs actually transmitted, and N is the number of MBS data transmitted within the first time window.

For case 1 in manner 1, the terminal device may determine the value of N in the following manner:

Manner I) The value of N satisfies the following formula: N=floor (the total number of PDCCH opportunities in the first time window/S), and floor represents a downward rounding operation; or, Manner II) The value of N is configured by the network device.

In the embodiment of the present application, for the PDCCH opportunity in the first time window, the corresponding relationship between the actually transmitted SSB and the index of the PDCCH opportunity is: for the first one MBS data in the first time window, the PDCCH opportunity with index number 0 corresponds to the first one SSB actually transmitted, the PDCCH opportunity with index number 1 corresponds to the second one SSB actually transmitted, and so on, until all actually transmitted SSBs corresponds to a PDCCH opportunity index for the first MBS data. For the n-th one MBS data in the first time window, the PDCCH opportunity with the index number $(n-1)*S+(k-1)$ corresponds to the k-th actually transmitted SSB.

It should be noted that the number of SSBs actually transmitted is S, and each SSB actually transmitted has a corresponding SSB index. For example, S=4, the number of SSBs actually transmitted is 4, the index of the first SSB actually transmitted is 1, the index of the second SSB actually transmitted is 2, and the index of the third SSB actually transmitted is 3, the index of the fourth SSB actually transmitted is 4.

Figure 6:
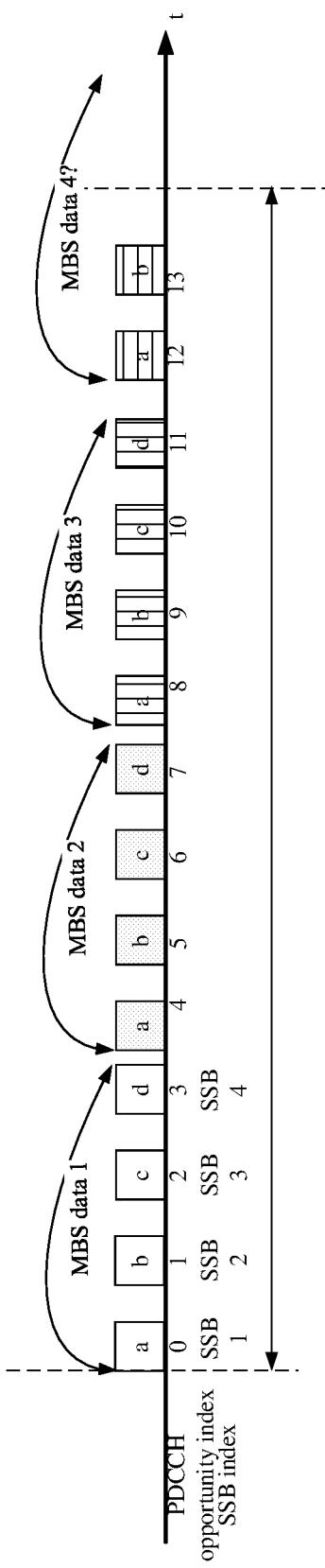
FIG. 6 is a first schematic diagram of the corresponding relationship between the PDCCH index and the SSB index provided by an embodiment of the present application.

In an example, referring to FIG. 6, for the first one MBS data (that is, MBS data 1) in the first time window, the index of the PDCCH opportunity corresponding to the second one actually transmitted SSB is: $(n-1)*S+(k-1)=(1-1)*4+(2-1)=1$. For the second one MBS data (that is, MBS data 2) in the first time window, the index of the PDCCH opportunity corresponding to the third one actually transmitted SSB is: $(n-1)*S+(k-1)=(2-1)*4+(3-1)=6$.

In an example, referring to FIG. 6, the number of MBS data transmitted in the first time window is: N=floor(the total number of PDCCH opportunities in the first time window/S)=floor(14/4)=3.

In an example, the network device may configure a parameter N through the MCCH or system broadcast message, wherein N represents the number of MBS data transmitted within the first time window.

2) Case 2

The above case 1 of the manner 1 is for the situation that the MBS data is not repeatedly transmitted. In an optional manner, the MBS data has H repeated transmissions, and H is a positive integer; here, the value of H is configured by the network device, for example, configured through MCCH or system broadcast message; or, the value of H is 1 by default.

It should be noted that, the MBS data having H repeated transmissions means: the total number of transmission times of the MBS data is H times. For example: H=2, it means that the MBS data has 2 repeated transmissions, the first repeated transmission refers to the initial transmission, and the second repeated transmission refers to the retransmission.

For the h-th repeated transmission of the n-th MBS data in the first time window, the index of the PDCCH opportunity corresponding to the k-th actually transmitted SSB is:

$(n-1)*S*H+S*(h-1)+(k-1)$;

wherein, h is a positive integer greater than or equal to 1 and less than or equal to H.

For the case 2 in the manner 1, the terminal device can determine the value of N in the following manner:

Manner I) The value of N satisfies the following formula: N=floor (the total number of PDCCH opportunities in the first time window/(S*H)), floor represents a rounding down operation; or, Manner II) The value of N is configured by the network device.

It should be noted that the number of SSBs actually transmitted is S, and each SSB actually transmitted has a corresponding SSB index. For example, S=4, the number of SSBs actually transmitted is 4, the index of the first one SSB actually transmitted is 1, the index of the second one SSB actually transmitted is 2, and the index of the third one SSB actually transmitted is 3, the index of the fourth one SSB actually transmitted is 4.

Figure 7:
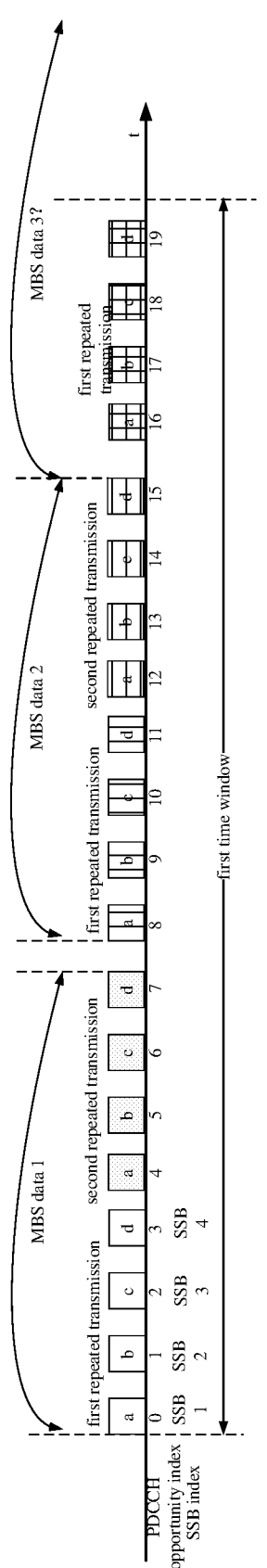
FIG. 7 is a second schematic diagram of the corresponding relationship between the PDCCH index and the SSB index provided by an embodiment of the present application.

In one example, referring to FIG. 7, H=2, MBS data has 2 repeated transmissions. For the second repeated transmission of the first one MBS data (that is, MBS data 1) in the first time window, the index of the PDCCH opportunity corresponding to the second one actually transmitted SSB is: $(n-1)*S*H+S*(h-1)+(k-1)=(1-1)*4*2+4*(2-1)+(2-1)=5$. For the first repeated transmission of the second one MBS data (that is, MBS data 2) in the first time window, the index of the PDCCH opportunity corresponding to the second actually transmitted SSB is: $(n-1)*S*H+S*(h-1)+(k-1)=(2-1)*4*2+4*(1-1)+(2-1)=9$.

In one example, referring to FIG. 7, the number of MBS data transmitted in the first time window is: N=floor (the total number of PDCCH opportunities in the first time window/(S*H))=floor(20/(4*2))=2.

In an example, the network device may configure a parameter N through the MCCH or system broadcast message, wherein N represents the number of MBS data transmitted within the first time window.

Manner 2

1) Case 1

The terminal device receives the second configuration information sent by the network device, the second configuration information is used to determine a PDCCH opportunity index list, the PDCCH opportunity index list includes N PDCCH opportunity indexes, and N is a positive integer greater than 1; each PDCCH opportunity index in the N PDCCH opportunity indexes is used to indicate the first one PDCCH opportunity corresponding to one MBS data.

For the MBS data, the index of the PDCCH opportunity corresponding to the k-th actually transmitted SSB is:

The index of the first one PDCCH opportunity corresponding to the MBS data+(k−1);

wherein, k is a positive integer greater than or equal to 1 and less than or equal to S; S is the number of SSBs actually transmitted.

In the above embodiment, the N is the number of MBS data transmitted within the first time window.

In this embodiment of the application, the network device configures a PDCCH opportunity index list through MCCH or system broadcast message (such as SIB), and each PDCCH opportunity index in the PDCCH opportunity index list is used to indicate the first one opportunity (first PDCCH opportunity) of the beam sweeping transmission of the MBS data, wherein the first PDCCH opportunity corresponds to the first actually transmitted SSB. It can be seen that for any piece of MBS data in the first time window, the index of the PDCCH opportunity corresponding to the k-th actually transmitted SSB of the MBS data is: the index of the first PDCCH opportunity corresponding to the MBS data+(k−1). It should be noted that the number of PDCCH opportunity indexes in the PDCCH opportunity index list is the number of MBS data transmitted within the first time window.

Figure 8:
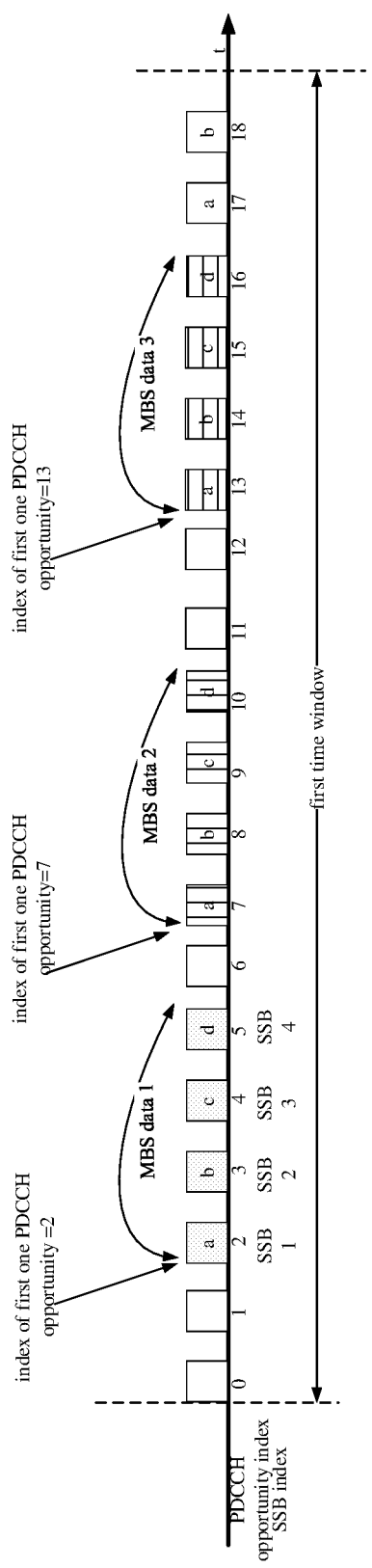
FIG. 8 is a third schematic diagram of the corresponding relationship between the PDCCH index and the SSB index provided by an embodiment of the present application.

In an example, referring to FIG. 8, for MBS data 1 in the first time window, the index of the PDCCH opportunity corresponding to the SSB of the third actual transmission of the MBS data is: the index of the first one PDCCH opportunity corresponding to the MBS data+(k−1)=2+(3−1)=4. For the MBS data 2 in the first time window, the index of the PDCCH opportunity corresponding to the second actually transmitted SSB of the MBS data is: the index of the first one PDCCH opportunity corresponding to the MBS data+(k−1)=7+(2−1)=8. For the MBS data 3 in the first time window, the index of the PDCCH opportunity corresponding to the first SSB actually transmitted in the MBS data is: the index of the first one PDCCH opportunity corresponding to the MBS data+(k−1)=13+(1−1)=13.

2) Case 2

The above case 1 of the manner 2 is for the situation that the MBS data is not repeatedly transmitted. In an optional method, the MBS data has H repeated transmissions, and H is a positive integer; here, the value of H is configured by the network device, for example, configured through MCCH or system broadcast message; or, the value of H is 1 by default.

It should be noted that, the MBS data having H repeated transmissions means: the total number of transmission times of the MBS data is H times. For example: H=2, it means that the MBS data has 2 repeated transmissions, the first repeated transmission refers to the initial transmission, and the second repeated transmission refers to the retransmission.

For the h-th repeated transmission of the MBS data, the index of the PDCCH opportunity corresponding to the k-th actually transmitted SSB is:

The index of the first PDCCH opportunity corresponding to the MBS data+$S*(h-1)+(k-1)$;

wherein, h is a positive integer greater than or equal to 1 and less than or equal to H.

In the above embodiment, the N is the number of MBS data transmitted within the first time window.

It should be noted that the number of SSBs actually transmitted is S, and each SSB actually transmitted has a corresponding SSB index. For example, S=4, the number of SSBs actually transmitted is 4, the index of the first SSB actually transmitted is 1, the index of the second SSB actually transmitted is 2, and the index of the third SSB actually transmitted is 3, the index of the fourth SSB actually transmitted is 4.

For case 2 in manner 2, the PDCCH time indices for the H repeated transmissions of the same MBS data are allocated continuously.

Figure 9:
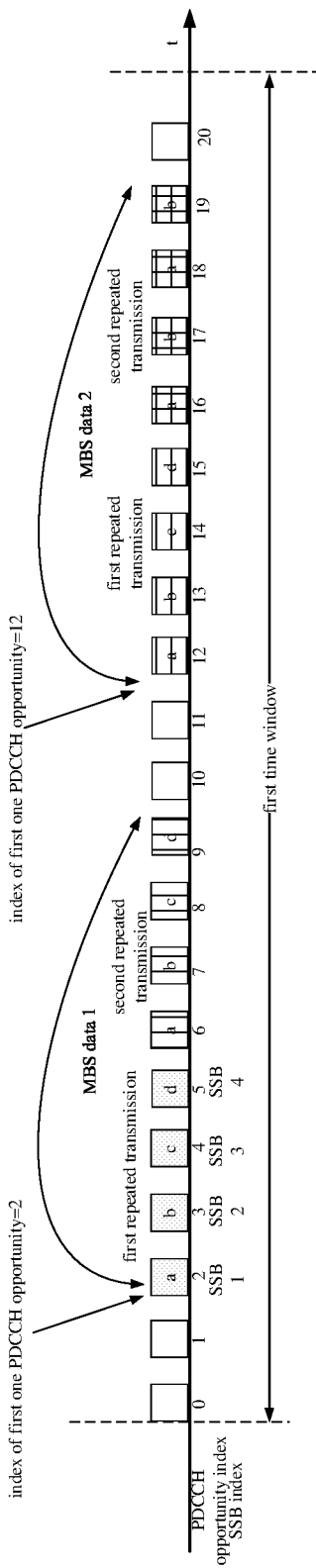
FIG. 9 is a fourth schematic diagram of the corresponding relationship between the PDCCH index and the SSB index provided by an embodiment of the present application.

In one example, referring to FIG. 9, H=2, MBS data has 2 repeated transmissions. For the second repeated transmission of MBS data 1 in the first time window, the index of the PDCCH opportunity corresponding to the SSB of the second actual transmission is: the index of the first one PDCCH opportunity corresponding to the MBS data+$S*(h-1)+(k-1)=2+4*(2-1)+(2-1)=7$. For the first repeated transmission of MBS data 2 in the first time window, the index of the PDCCH opportunity corresponding to the SSB of the third actual transmission is: the index of the first one PDCCH opportunity corresponding to the MBS data+$S*(h-1)+(k-1)=12+4*(1-1)+(3-1)=14$.

3) Case Three

The above case 1 of the manner 2 is for the situation that the MBS data is not repeatedly transmitted. In an optional method, the MBS data has H repeated transmissions, and H is a positive integer; here, the value of H is configured by the network device, for example, configured through MCCH or system broadcast message; or, the value of H is 1 by default.

It should be noted that, the MBS data having H repeated transmissions means: the total number of transmission times of the MBS data is H times. For example: H=2, indicating that the MBS data has 2 repeated transmissions, the first repeated transmission refers to the initial transmission, and the second repeated transmission refers to the retransmission.

For the h-th repeated transmission of the MBS data, the index of the PDCCH opportunity corresponding to the k-th actually transmitted SSB is:

The index of the first one PDCCH opportunity corresponding to the h-th repeated transmission of the MBS data+(k−1);

wherein, h is a positive integer greater than or equal to 1 and less than or equal to H.

In the above embodiment, the index of the first one PDCCH opportunity corresponding to the h-th repeated transmission is configured by the network device.

In the above embodiment, the N is the number of MBS data transmitted within the first time window.

It should be noted that the number of SSBs actually transmitted is S, and each SSB actually transmitted has a corresponding SSB index. For example, S=4, the number of SSBs actually transmitted is 4, the index of the first SSB actually transmitted is 1, the index of the second SSB actually transmitted is 2, and the index of the third SSB actually transmitted is 3, the index of the fourth SSB actually transmitted is 4.

For the case 3 in the manner 2, in addition to configuring the PDCCH opportunity index list in the above solution, the network device also configures the index of the first one PDCCH opportunity for each repeated transmission for each MBS data.

Figure 10:
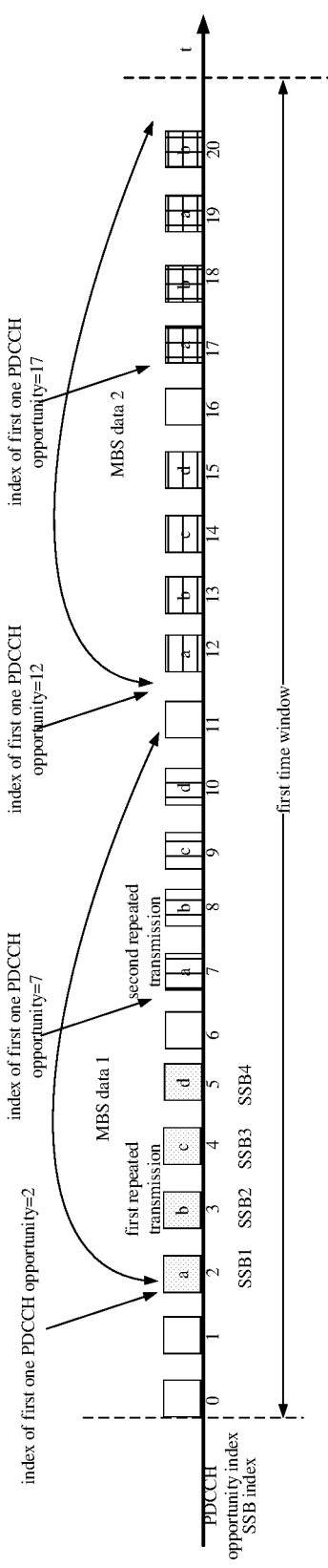
FIG. 10 is a fifth schematic diagram of the corresponding relationship between the PDCCH index and the SSB index provided by an embodiment of the present application.

In one example, referring to FIG. 10, H=2, MBS data has 2 repeated transmissions. For the second repeated transmission of MBS data 1 in the first time window, the index of the PDCCH opportunity corresponding to the SSB of the second actual transmission is: the index of the first one PDCCH opportunity corresponding to the h-th repeated transmission of the MBS data+(k−1)=7+(2−1)=8. For the first repeated transmission of MBS data 2 in the first time window, the index of the PDCCH opportunity corresponding to the third actually transmitted SSB is: the index of the first one PDCCH opportunity corresponding to the h-th repeated transmission of the MBS data+(k−1)=12+(3−1)=14.

Manner 3

1) Case 1

The terminal device receives the third configuration information sent by the network device, the third configuration information is used to determine the MBS data interval, and the MBS data interval is used to indicate the number of PDCCH opportunities between two adjacent MBS data.

For the n-th MBS data in the first time window, the index of the PDCCH opportunity corresponding to the k-th actually transmitted SSB is:

$$\text{First PDCCH opportunity index} + (n-1)*\text{MBS data interval} + (k-1);$$

wherein, the first PDCCH opportunity index is used to indicate the first one PDCCH opportunity corresponding to the first one MBS data in the first time window, n is a positive integer greater than or equal to 1 and less than or equal to N, and k is a positive integer greater than or equal to 1 and less than or equal to S; S is the number of SSBs actually transmitted, and N is the number of MBS data transmitted in the first time window.

In the above embodiment, the first PDCCH opportunity index is configured by a network device; or, the first PDCCH opportunity index is 0 by default.

For the case 1 in manner 3, the terminal device may determine the value of N in the following manners:

Manner I): The value of N satisfies the following formula: first PDCCH opportunity index+N*MBS data interval≤total number of PDCCH opportunities in the first time window−1; or, Manner II): The value of N is configured by the network device.

In this embodiment of the application, the network device configures a PDCCH opportunity index (referred to as the first PDCCH opportunity index) through MCCH or system broadcast message (such as SIB), and the first PDCCH opportunity index is used to indicate the index of the first one PDCCH opportunity of the first one SSB actually transmitted by beam sweeping transmission in the first time window, wherein the first one PDCCH opportunity corresponds to the first one SSB actually transmitted. Or, the network device is not configured with the first PDCCH opportunity index. In this case, the first PDCCH opportunity index is 0 by default. In addition, the network device also configures an MBS data interval (MBS data interval) through MCCH or system broadcast messages (such as SIB), and the MBS data interval is used to indicate the number of PDCCH opportunities between adjacent two MBS data, for example, the number of PDCCH opportunities between the first MBS data and the second MBS data in the first time window. Here, the index of the first one PDCCH opportunity of other MBS data except the first MBS data can be determined according to the first PDCCH opportunity index and the MBS data interval.

It should be noted that the number of PDCCH opportunities between two adjacent MBS data may refer to: the number of PDCCH opportunities between the first PDCCH opportunities of two adjacent MBS data, or the number of PDCCH opportunities between the last PDCCH opportunities of two adjacent MBS data.

Figure 11:
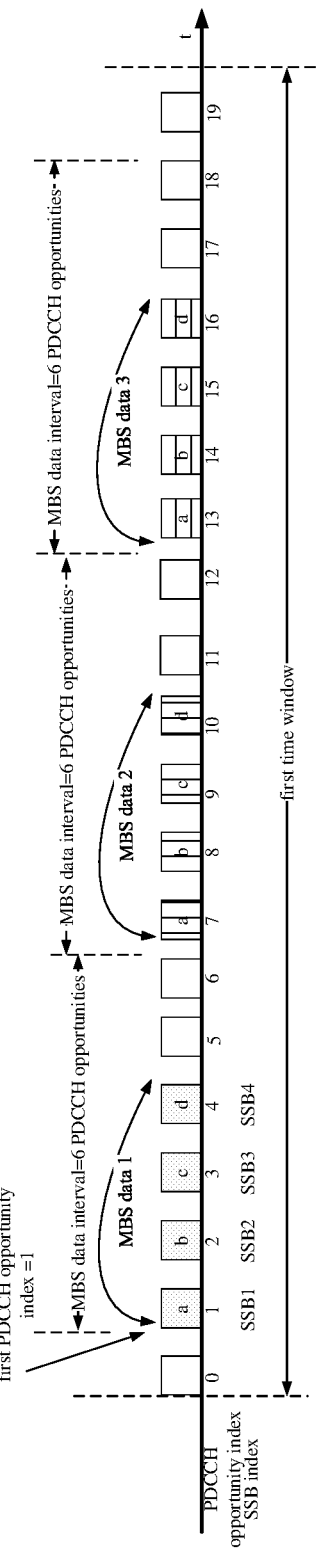
FIG. 11 is a sixth schematic diagram of the corresponding relationship between the PDCCH index and the SSB index provided by an embodiment of the present application.

In an example, referring to FIG. 11, the network device configures the first PDCCH opportunity index as 1. For MBS data 1 in the first time window, the index of the PDCCH opportunity corresponding to the SSB of the third actual transmission of the MBS data is: first PDCCH opportunity index+(n−1)*MBS data interval+(k−1)=1+(1−1)*6+(3−1)=3. For MBS data 2 in the first time window, the index of the PDCCH opportunity corresponding to the SSB of the second actual transmission of the MBS data is: first PDCCH opportunity index+(n−1)*MBS data interval+(k−1)=1−42−1)*6+(2−1)=8. For MBS data 3 in the first time window, the index of the PDCCH opportunity corresponding to the SSB of the fourth actual transmission of the MBS data is: first PDCCH opportunity index+(n−1)*MBS data interval+(k−1)=1+(3−1)*6+(4−1)=16.

In an example, referring to FIG. 11, the value of the number N of MBS data transmitted in the first time window satisfies the following formula: first PDCCH opportunity index+N*MBS data interval≤total number of PDCCH opportunities in the first time window−1, it can be seen that 1+N*6≤20−1, and the value of N is 3.

Figure 12:
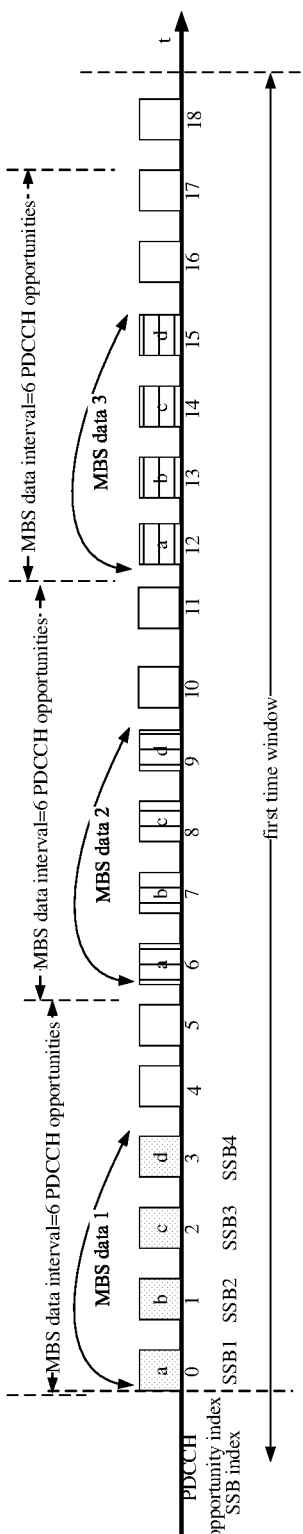
FIG. 12 is a seventh schematic diagram of the corresponding relationship between the PDCCH index and the SSB index provided by an embodiment of the present application.

In one example, referring to FIG. 12, the first PDCCH opportunity index is 0 by default. For MBS data 1 in the first time window, the index of the PDCCH opportunity corresponding to the SSB of the third actual transmission of the MBS data is: first PDCCH opportunity index+(n−1)*MBS data interval+(k−1)=0+(1−1)*6+(3−1)=2. For MBS data 2 in the first time window, the index of the PDCCH opportunity corresponding to the SSB of the second actual transmission of the MBS data is: first PDCCH opportunity index+(n−1)*MBS data interval+(k−1)=0+(2−1)*6+(2−1)=7. For MBS data 3 in the first time window, the index of the PDCCH opportunity corresponding to the SSB of the fourth actual transmission of the MBS data is: first PDCCH opportunity index+(n−1)*MBS data interval+(k−1)=0+(3−1)*6+(4−1)=15.

In one example, referring to FIG. 12, the value of the number N of MBS data transmitted in the first time window satisfies the following formula: first PDCCH opportunity index+N*MBS data interval≤total number of PDCCH opportunities in the first time window−1, it can be seen that 0+N*6≤19−1, and the value of N is 3.

In an example, the network device may configure a parameter N through the MCCH or system broadcast message, wherein N represents the number of MBS data transmitted within the first time window.

2) Case 2

The above case 1 in the manner 3 is for the situation that the MBS data is not repeatedly transmitted. In an optional manner, the MBS data has H repeated transmissions, and H is a positive integer; here, the value of H is configured by the network device, for example, configured through MCCH or system broadcast message; or, the value of H is 1 by default.

It should be noted that, the MBS data having H repeated transmissions means: the total number of transmission times of the MBS data is H times. For example: H=2, it means that the MBS data has 2 repeated transmissions, the first repeated transmission refers to the initial transmission, and the second repeated transmission refers to the retransmission.

For the h-th repeated transmission of the n-th MBS data in the first time window, the index of the PDCCH opportunity corresponding to the k-th actually transmitted SSB is:

$$\text{First PDCCH opportunity index} + (n-1)*\text{MBS data interval} + S*(h-1) + (k-1);$$

wherein, h is a positive integer greater than or equal to 1 and less than or equal to H.

It should be noted that the number of SSBs actually transmitted is S, and each SSB actually transmitted has a corresponding SSB index. For example, S=4, the number of SSBs actually transmitted is 4, the index of the first SSB actually transmitted is 1, the index of the second SSB actually transmitted is 2, and the index of the third SSB actually transmitted is 3, the index of the fourth SSB actually transmitted is 4.

For case 2 in manner 3, the terminal device may determine the value of N in the following manner:

Manner I): The value of N satisfies the following formula: first PDCCH opportunity index+N*MBS data interval≤total number of PDCCH opportunities in the first time window−1; or, Manner II): The value of N is configured by the network device.

It should be noted that the number of PDCCH opportunities between two adjacent MBS data may refer to: the number of PDCCH opportunities between the first PDCCH opportunities of two adjacent MBS data, or the number of PDCCH opportunities between the last PDCCH opportunities of two adjacent MBS data. For ease of description, the number of PDCCH opportunities between adjacent two MBS data intervals is understood as the number of PDCCH opportunities between the first PDCCH opportunities of two adjacent MBS data. It can be seen that an MBS data interval contains the PDCCH opportunities of all repeated transmissions (that is, the H times of repeated transmissions) corresponding to one MBS data.

For the case 2 in the manner 3, the indices of the PDCCH timing for the H repeated transmissions of the same MBS data are allocated continuously. In other words, the indices of the PDCCH opportunities of all repeated transmissions corresponding to one MBS data contained in one MBS data interval (that is, H times of repeated transmissions) are allocated continuously.

Figure 13:
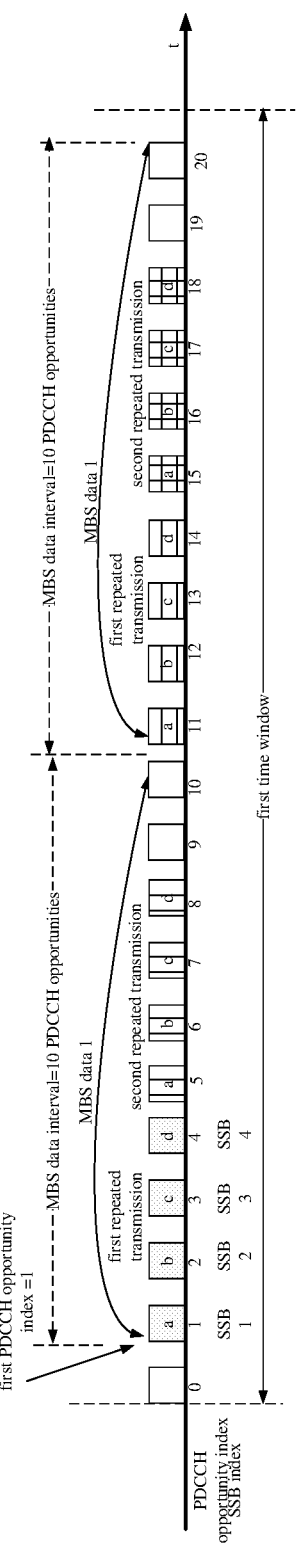
FIG. 13 is an eighth schematic diagram of the corresponding relationship between the PDCCH index and the SSB index provided by an embodiment of the present application.

In one example, referring to FIG. 13, H=2, MBS data has 2 repeated transmissions. For the second repeated transmission of MBS data 1 in the first time window, the index of the PDCCH opportunity corresponding to the SSB of the second actual transmission is: first PDCCH opportunity index+(n−1)*MBS data interval+S*(h−1)+(k−1)=1+(1−1)*10+4*(2−1)+(2−1)=6. For the first repeated transmission of MBS data 2 in the first time window, the index of the PDCCH opportunity corresponding to the SSB of the third actual transmission is: first PDCCH opportunity index+(n−1)*MBS data interval+S*(h−1)+(k−1)=1+(2−1)*10+4*(1−1)+(3−1)=13.

3) Case Three

The above case 1 in the manner 3 is for the situation that the MBS data is not repeatedly transmitted. In an optional method, the MBS data has H repeated transmissions, and H is a positive integer; here, the value of H is configured by the network device, for example, through MCCH or system broadcast message configuration; or, the value of H is 1 by default.

It should be noted that, the MBS data having H repeated transmissions means: the total number of transmission times of the MBS data is H times. For example: H=2, it means that the MBS data has 2 repeated transmissions, the first repeated transmission refers to the initial transmission, and the second repeated transmission refers to the retransmission.

For the h-th repeated transmission of the n-th MBS data in the first time window, the index of the PDCCH opportunity corresponding to the k-th actually transmitted SSB is:

First PDCCH opportunity index+(n-1)*MBS transmission interval*H+(h−1)*MBS transmission interval+(k−1);

wherein, h is a positive integer greater than or equal to 1 and less than or equal to H.

It should be noted that the number of SSBs actually transmitted is S, and each SSB actually transmitted has a corresponding SSB index. For example, S=4, the number of SSBs actually transmitted is 4, the index of the first SSB actually transmitted is 1, the index of the second SSB actually transmitted is 2, and the index of the third SSB actually transmitted is 3, the index of the fourth SSB actually transmitted is 4.

Here, the MBS transmission interval is used to indicate the number of PDCCH opportunities between two adjacent transmissions, and the two adjacent transmissions belong to two transmissions of the same MBS data or two transmissions of different MBS data. For example: there are 2 MBS data in the first time window, and these 2 MBS data have 2 repeated transmissions respectively, that is, MBS data 1 has the 1st repeated transmission and the 2nd repeated transmission, and MBS data 2 has the 1st repeated transmission and the 2nd repeated transmission, then, the number of PDCCH opportunities between the 1st repeated transmission and the 2nd repeated transmission of MBS data 1 is D1, and the number of PDCCH opportunities between the 1st repeated transmission and the 2nd repeated transmission of MBS data 2 is D2, the number of PDCCH opportunities between the 2nd repeated transmission of MBS data 1 and the 1st repeated transmission of MBS data 2 is D3, D1, D2 and D3 are equal and are indicated by the MBS transmission interval.

It should be noted that the number of PDCCH opportunities between two adjacent transmissions may refer to: the number of PDCCH opportunities between the first PDCCH opportunities of two adjacent transmissions, or the number of PDCCH opportunities between the last PDCCH opportunities of two adjacent transmissions.

For the case 3 in the manner 3, the terminal device may determine the value of N in the following manner Manner I): The value of N satisfies the following formula: first PDCCH opportunity index+N*MBS transmission interval*H≤total number of PDCCH opportunities in the first time window−1; or, Manner II): The value of N is configured by the network device.

Figure 14:
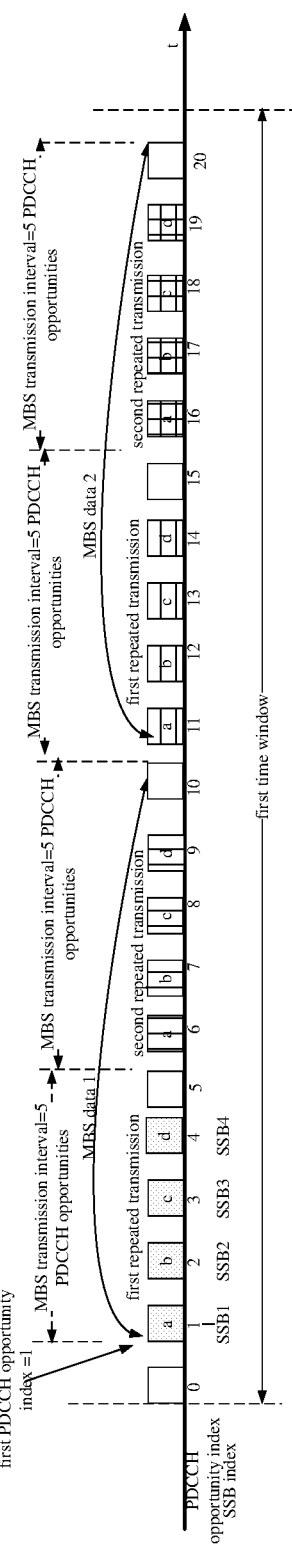
FIG. 14 is a ninth schematic diagram of the corresponding relationship between the PDCCH index and the SSB index provided by an embodiment of the present application.

In one example, referring to FIG. 14, H=2, and the MBS data has 2 repeated transmissions. For the second repeated transmission of MBS data 1 in the first time window, the index of the PDCCH opportunity corresponding to the SSB of the second actual transmission is: first PDCCH opportunity index+(n−1)*MBS transmission interval*H+(h−1)*MBS transmission interval+(k−1)=1+(1−1)*5*2+(2−1)*5+(2−1)=7. For the second repeated transmission of MBS data 2 in the first time window, the index of the PDCCH opportunity corresponding to the SSB of the third actual transmission is: first PDCCH opportunity index+(n−1)*MBS transmission interval*H+(h−1)*MBS transmission interval+(k−1)=1+(2−1)*5*2+(2−1)*5+(3−1)=18.

4) Case 4

The above case 1 of the manner 3 is for the situation that the MBS data is not repeatedly transmitted. In an optional mode, the MBS data has H repeated transmissions, and H is a positive integer; here, the value of H is configured by the network device, for example, configured through MCCH or system broadcast message; or, the value of H is 1 by default.

It should be noted that, the MBS data having H repeated transmissions means: the total number of transmission times of the MBS data is H times. For example: H=2, it means that the MBS data has 2 repeated transmissions, the first repeated transmission refers to the initial transmission, and the second repeated transmission refers to the retransmission.

For the h-th repeated transmission of the n-th MBS data in the first time window, the index of the PDCCH opportunity corresponding to the k-th actually transmitted SSB is:

$$\text{First PDCCH opportunity index} + (n-1)*\text{MBS data interval} + (h-1)*\text{MBS repetition interval} + (k-1);$$

wherein, h is a positive integer greater than or equal to 1 and less than or equal to H.

Here, the MBS repetition interval is used to indicate the number of PDCCH opportunities that are separated between two adjacent transmissions of the same MBS data. For example: there are 2 MBS data in the first time window, and these 2 MBS data have 2 repeated transmissions respectively, that is, MBS data 1 has the 1st repeated transmission and the 2nd repeated transmission, and MBS data 2 has the 1st repeated transmission and the 2nd repeated transmission, then, the number of PDCCH opportunities between the 1st repeated transmission and the 2nd repeated transmission of MBS data 1 is D1, and the number of PDCCH opportunities between the 1st repeated transmission and the 2nd repeated transmission of MBS data 2 is D2, D1 and D2 are equal, and both are indicated by the MBS repetition interval.

It should be noted that the number of PDCCH opportunities between two adjacent MBS data may refer to: the number of PDCCH opportunities between the first PDCCH opportunities of two adjacent MBS data, or the number of PDCCH opportunities between the last PDCCH opportunities of two adjacent MBS data. For example: there are 2 MBS data in the first time window, and these 2 MBS data have 2 repeated transmissions respectively, that is, MBS data 1 has the 1st repeated transmission and the 2nd repeated transmission, and MBS data 2 has the 1st repeated transmission and the 2nd repeated transmission, then, the number of PDCCH opportunities between the first one PDCCH opportunity of the 1st repeated transmission of MBS data 1 and the first one PDCCH opportunity of the 1st repeated transmission of MBS data 2 is indicated by the MBS data interval.

It should be noted that the MBS data interval may be an integer multiple of the MBS repetition interval, or the MBS data interval and the MBS repetition interval have no integer multiple relationship.

It should be noted that the number of SSBs actually transmitted is S, and each SSB actually transmitted has a corresponding SSB index. For example, S=4, the number of SSBs actually transmitted is 4, the index of the first SSB actually transmitted is 1, the index of the second SSB actually transmitted is 2, and the index of the third SSB actually transmitted is 3, the index of the fourth SSB actually transmitted is 4.

For the case 4 in the manner 3, the terminal device may determine the value of N in the following manner Manner I): The value of N satisfies the following formula:
first PDCCH opportunity index+N*MBS data interval total number of PDCCH opportunities in the first time window−1; or, Manner II): The value of N is configured by the network device.

Figure 15:
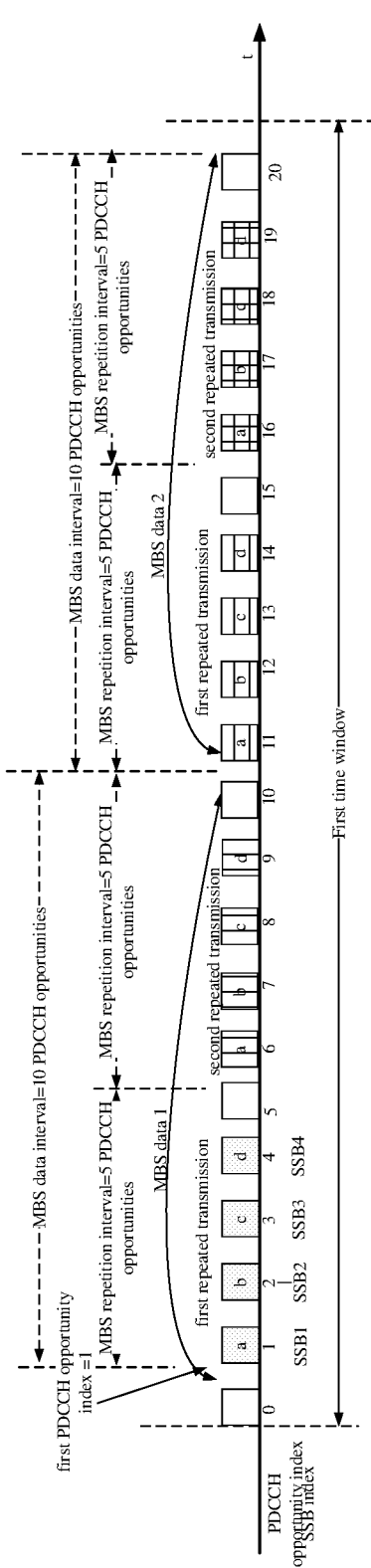
FIG. 15 is a tenth schematic diagram of the corresponding relationship between the PDCCH index and the SSB index provided by an embodiment of the present application.

In one example, referring to FIG. 15, the MBS data interval is 10 PDCCH opportunities, the MBS repetition interval is 5 PDCCH opportunities, and the MBS data interval is twice the MBS repetition interval. Of course, it is not limited to this, and the MBS data interval may also have no integer multiple relationship with the MBS repetition interval. H=2, MBS data has 2 repeated transmissions. For the second repeated transmission of MBS data 1 in the first time window, the index of the PDCCH opportunity corresponding to the SSB of the second actual transmission is: first PDCCH opportunity index+(n−1)*MBS data interval+(h−1)*MBS repetition interval+(k−1)=1+(1−1)*10+(2−1)*5+(2−1)=7. For the second repeated transmission of MBS data 2 in the first time window, the index of the PDCCH opportunity corresponding to the SSB of the third actual transmission is: first PDCCH opportunity index+(n−1)*MBS data interval+(h−1)*MBS repetition interval+(k−1)=1+(2−1)*10+(2−1)*5+(3−1)=18.

It should be noted that, in the above-mentioned examples in FIG. 13 to FIG. 15, the network device configures the first PDCCH opportunity index as 1 for illustration. It is not limited thereto, and the network device may not configure the first PDCCH opportunity index, in this case, the first PDCCH opportunity index is 0 by default.

It should be noted that the same parameter has the same meaning in the embodiments of the present application. For example, S is the number of SSBs actually transmitted, N is the number of MBS data transmitted in the first time window, H is the number of repeated transmissions of MBS data, n is a positive integer greater than or equal to 1 and less than or equal to N, and k is a positive integer greater than or equal to 1 and less than or equal to S, h is a positive integer greater than or equal to 1 and less than or equal to H.

In the embodiment of this application, after determining the corresponding relationship between the index of the PDCCH opportunity and the index of the SSB through the above scheme, the terminal device can monitor the PDCCH opportunity at the corresponding position (such as the corresponding beam) according to the SSB index, so as to effectively receive the MBS PDCCH, and provide a guarantee for the subsequent correct reception of the MBS PDSCH.

Figure 16:
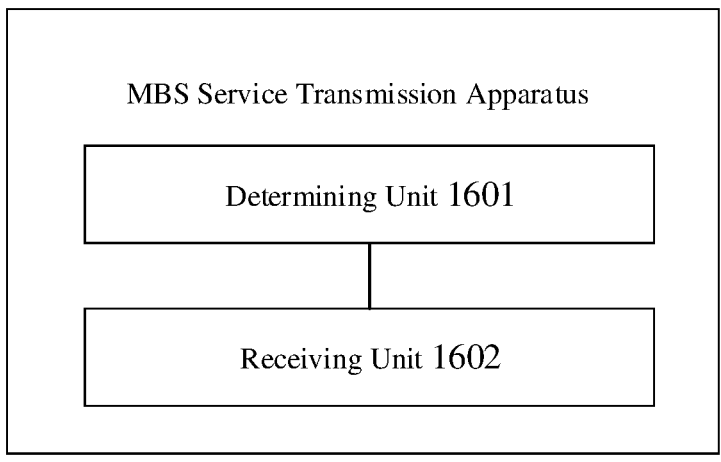
FIG. 16 is a schematic diagram of the structural composition of the MBS service transmission apparatus provided by an embodiment of the present application.

FIG. 16 is a schematic diagram of the structure and composition of the MBS service transmission apparatus provided by the embodiment of the present application, which is applied to a terminal device. As shown in FIG. 16, the MBS service transmission device includes:

a determining unit 1601 used to determine a corresponding relationship between a PDCCH opportunity and an SSB index, wherein the PDCCH opportunity is used to transmit an MBS PDCCH; and a receiving unit 1602 used to receive the MBS PDCCH based on the correspondence between the PDCCH opportunity and the SSB index.

In an optional manner, the apparatus further includes:

an acquiring unit (not shown in the drawings) used to acquire first configuration information, wherein the first configuration information is used to determine a first time window;

wherein, within the first time window, the PDCCH opportunity corresponding to the MBS service is numbered from 0.

In an optional manner, the first configuration information includes first indication information, the first indication information is used to determine a length and/or a cycle of the first time window, and is used to determine a starting position of the first time window.

In an optional manner, the first indication information is used to indicate K, and K is a positive integer greater than or equal to 1;

the length of the first time window is K radio frames; and a wireless frame where the starting position of the first time window is located satisfies the following formula: SFN mod K=0, wherein, SFN represents a serial number of the wireless frame where the starting position of the first time window is located, and mod represents a remainder operation.

In an optional manner, the first configuration information includes first indication information and second indication information, the first indication information is used to determine a length and/or a cycle of the first time window, and the second indication information is used to determine a starting position of the first time window.

In an optional manner, the first indication information is used to indicate T, and T is a positive integer greater than or equal to 1; and the second indication information is used to indicate an offset value offset;

the length of the first time window is T radio frames; and at least one of a radio frame, a subframe, a time slot and a symbol where the starting position of the first time window is located is determined based on the offset.

In an optional manner, the radio frame where the starting position of the first time window is located satisfies the following formula:

$$SFN \bmod T=offset;$$

wherein, SFN represents a serial number of the radio frame where the starting position of the first time window is located, and mod represents a remainder operation.

In an optional manner, the radio frame and subframe where the starting position of the first time window is located satisfy the following formulas:

$$SFN \bmod T=floor(offset/10);$$

$$subframe=offset \bmod 10;$$

wherein, SFN represents a serial number of the wireless frame where the starting position of the first time window is located, subframe represents a serial number of the subframe where the starting position of the first time window is located, mod represents a remainder operation, and floor represents downward rounding operation.

In an optional manner, the first configuration information includes DRX configuration information, the DRX configuration information is used to determine a DRX cycle, and the DRX cycle includes a first time period and a second time period, the first time period is a time period where a DRX active time is located, and the second time period is a time period where a DRX inactive time is located;

the first time window is the first time period; or, the first time window is the DRX cycle.

In an optional manner, the first configuration information is protocol defined; or, the first configuration information is configured by a network device through an MCCH; or, the first configuration information is configured by the network device through a system broadcast message.

In an optional manner, for an n-th MBS data in the first time window, an index of the PDCCH opportunity corresponding to a k-th actually transmitted SSB is:

$$(n-1)*S+(k-1);$$

wherein, n is a positive integer greater than or equal to 1 and less than or equal to N, k is a positive integer greater than or equal to 1 and less than or equal to S; S is a number of SSBs actually transmitted, and N is a number of MBS data transmitted within the first time window.

In an optional manner, a value of N satisfies the following formula: N=floor (the total number of PDCCH opportunities in the first time window/S), and floor represents a rounding down operation; or, the value of N is configured by a network device.

In an optional manner, the MBS data has H repeated transmissions, and H is a positive integer;

for an h-th repeated transmission of the n-th MBS data in the first time window, the index of the PDCCH opportunity corresponding to the k-th actually transmitted SSB is:

$$(n-1)*S*H+S*(h-1)+(k-1);$$

wherein, h is a positive integer greater than or equal to 1 and less than or equal to H.

In an optional manner, a value of N satisfies the following formula: N=floor (total number of PDCCH opportunities in the first time window/(S*H)), wherein floor represents a rounding down operation; or, the value of N is configured by a network device.

In an optional manner, the receiving unit 1602 is further used to receive second configuration information sent by a network device, wherein the second configuration information is used to determine a PDCCH opportunity index list, the PDCCH opportunity index list includes N PDCCH opportunity indexes, and N is a positive integer greater than 1; each PDCCH opportunity index in the N PDCCH opportunity indexes is used to indicate a first one PDCCH opportunity corresponding to one MBS data;

for the MBS data, an index of the PDCCH opportunity corresponding to a k-th actually transmitted SSB is:

index of the first PDCCH opportunity corresponding to the MBS data+(k-1);

wherein, k is a positive integer greater than or equal to 1 and less than or equal to S; and S is a number of SSBs actually transmitted.

In an optional manner, the MBS data has H repeated transmissions, and H is a positive integer;

for an h-th repeated transmission of the MBS data, the index of the PDCCH opportunity corresponding to the k-th actually transmitted SSB is:

index of the first one PDCCH opportunity corresponding to the MBS data+$S*(h-1)+(k-1)$;

wherein, h is a positive integer greater than or equal to 1 and less than or equal to H.

In an optional manner, the MBS data has H repeated transmissions, and H is a positive integer;

for an h-th repeated transmission of the MBS data, the index of the PDCCH opportunity corresponding to the k-th actually transmitted SSB is:

index of the first PDCCH opportunity corresponding to the h-th repeated transmission of the MBS data+(k-1);

wherein, h is a positive integer greater than or equal to 1 and less than or equal to H.

In an optional manner, the index of the first one PDCCH opportunity corresponding to the h-th repeated transmission is configured by a network device.

In an optional manner, N is the number of MBS data transmitted within the first time window.

In an optional manner, the receiving unit 1602 is further used to receive third configuration information sent by a network device, wherein the third configuration information is used to determine an MBS data interval, and the MBS data interval is used to indicate a number of PDCCH opportunities between two adjacent MBS data intervals;

for an n-th MBS data in the first time window, an index of the PDCCH opportunity corresponding to a k-th actually transmitted SSB is:

first PDCCH opportunity index+(n−1)*MBS data interval+(k−1);

wherein, the first PDCCH opportunity index is used to indicate a first one PDCCH opportunity corresponding to the first one MBS data in the first time window, n is a positive integer greater than or equal to 1 and less than or equal to N, and k is a positive integer greater than or equal to 1 and less than or equal to S; S is a number of SSBs actually transmitted, and N is a number of MBS data transmitted in the first time window.

In an optional manner, the first PDCCH opportunity index is configured by the network device; or, the first PDCCH opportunity index is 0 by default.

In an optional manner, a value of N satisfies the following formula: first PDCCH opportunity index+N*MBS data interval≤total number of PDCCH opportunities in the first time window−1; or, the value of N is configured by the network device.

In an optional manner, the MBS data has H repeated transmissions, and H is a positive integer;

for an h-th repeated transmission of the n-th MBS data in the first time window, the index of the PDCCH opportunity corresponding to the k-th actually transmitted SSB is:

first PDCCH opportunity index+($n$−1)*MBS data interval+$S$*($h$−1)+($k$−1);

wherein, h is a positive integer greater than or equal to 1 and less than or equal to H.

In an optional manner, a value of N satisfies the following formula: first PDCCH opportunity index+N*MBS data interval≤total number of PDCCH opportunities in the first time window−1; or, the value of N is configured by the network device.

In an optional manner, the MBS data has H repeated transmissions, and H is a positive integer;

for an h-th repeated transmission of the n-th MBS data in the first time window, the index of the PDCCH opportunity corresponding to the k-th actually transmitted SSB is:

first PDCCH opportunity index+($n$−1)*MBS transmission interval*$H$+($h$−1)*MBS transmission interval+($k$−1);

wherein, h is a positive integer greater than or equal to 1 and less than or equal to H.

In an optional manner, a value of N satisfies the following formula: first PDCCH opportunity index+N*MBS transmission interval*H≤total number of PDCCH opportunities in the first time window−1; or, the value of N is configured by the network device.

In an optional manner, the MBS transmission interval is used to indicate the number of PDCCH opportunities between two adjacent transmissions, and the two adjacent transmissions belong to two transmissions of a same MBS data or two transmission of different MBS data.

In an optional manner, the MBS data has H repeated transmissions, and H is a positive integer;

for an h-th repeated transmission of the n-th MBS data in the first time window, the index of the PDCCH opportunity corresponding to the k-th actually transmitted SSB is:

first PDCCH opportunity index+($n$−1)*MBS data interval+($h$−1)*MBS repetition interval+($k$−1);

wherein, h is a positive integer greater than or equal to 1 and less than or equal to H.

In an optional manner, a value of N satisfies the following formula: first PDCCH opportunity index+N*MBS data interval total number of PDCCH opportunities in the first time window−1; or, the value of N is configured by the network device.

In an optional manner, the MBS repetition interval is used to indicate the number of PDCCH opportunities between two adjacent transmissions of the same MBS data.

In an optional manner, a value of H is configured by a network device; or, the value of H is 1 by default.

Those skilled in the art should understand that the relevant descriptions of the apparatus for MBS service transmission in the embodiment of the present application may be understood with reference to the relevant description of the method for MBS service transmission in the embodiment of the present application.

It should be noted that the technical solutions of the embodiments of the present application can be applied not only to the terminal device side, but also to the network device side, such as a base station. Specifically, the network device determines the correspondence between the PDCCH opportunity and the SSB index, and the PDCCH opportunity is used to transmit the MBS PDCCH; the network device sends the MBS PDCCH based on the correspondence between the PDCCH opportunity and the SSB index. Here, the solution for the network device to determine the corresponding relationship between the PDCCH opportunity and the SSB index can refer to the relevant description on the terminal device side, and will not be repeated here.

Figure 17:
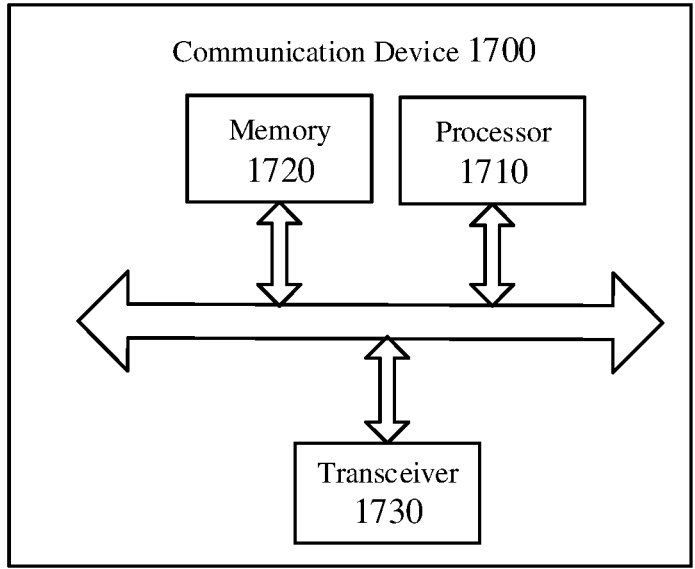
FIG. 17 is a schematic structural diagram of a communication device provided by an embodiment of the present application.

FIG. 17 is a schematic structural diagram of a communication device 1700 provided by an embodiment of the present application. The communication device can be a terminal device or a network device. The communication device 1700 shown in FIG. 17 includes a processor 1710, and the processor 1710 can call and run a computer program from a memory to realize the method in the embodiment of the present application.

Optionally, as shown in FIG. 17, the communication device 1700 may further include a memory 1720. Wherein, the processor 1710 can invoke and run a computer program from the memory 1720, so as to implement the method in the embodiment of the present application.

In the embodiment, the memory 1720 may be an independent device independent of the processor 1710, or may be integrated in the processor 1710.

Optionally, as shown in FIG. 17, the communication device 1700 may further include a transceiver 1730, and the processor 1710 may control the transceiver 1730 to communicate with other devices, specifically, to send information or data to other devices, or receive information or data sent by other devices.

In the embodiment, the transceiver 1730 may include a transmitter and a receiver. The transceiver 1730 may further include an antenna, and the number of antennas may be one or more.

Optionally, the communication device 1700 may specifically be the network device of the embodiment of the present application, and the communication device 1700 may implement the corresponding process implemented by the network device in each method of the embodiment of the present application. For the sake of brevity, details are not repeated here.

Optionally, the communication device 1700 may specifically be the mobile terminal/terminal device of the embodiment of the present application, and the communication device 1700 may implement the corresponding processes implemented by the mobile terminal/terminal device in each method of the embodiment of the present application, for the sake of brevity, which will not be repeated here.

Figure 18:
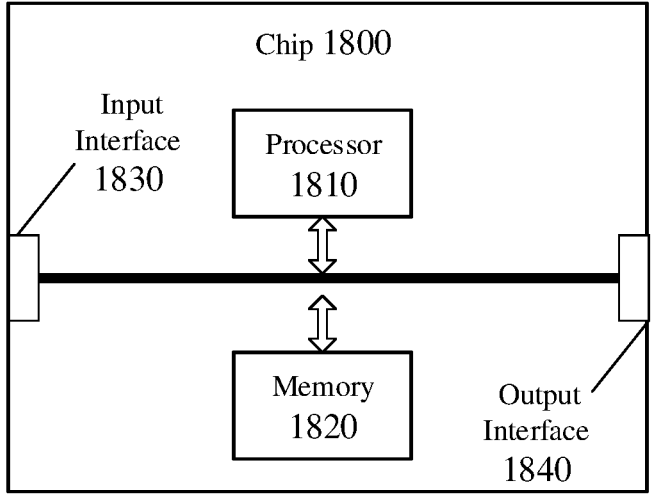
FIG. 18 is a schematic structural diagram of a chip according to an embodiment of the present application.

FIG. 18 is a schematic structural diagram of a chip according to an embodiment of the present application. The chip 1800 shown in FIG. 18 includes a processor 1810, and the processor 1810 can call and run a computer program from a memory, so as to implement the method in the embodiment of the present application.

Optionally, as shown in FIG. 18, the chip 1800 may further include a memory 1820. Wherein, the processor 1810 can invoke and run a computer program from the memory 1820, so as to implement the method in the embodiment of the present application.

In the embodiment, the memory 1820 may be a separate device independent of the processor 1810, or may be integrated in the processor 1810.

Optionally, the chip 1800 may further include an input interface 1830. Wherein, the processor 1810 can control the input interface 1830 to communicate with other devices or chips, specifically, can obtain information or data sent by other devices or chips.

Optionally, the chip 1800 may also include an output interface 1840. Wherein, the processor 1810 can control the output interface 1840 to communicate with other devices or chips, specifically, can output information or data to other devices or chips.

Optionally, the chip can be applied to the network device in the embodiment of the present application, and the chip can implement the corresponding processes implemented by the network device in the methods of the embodiment of the present application. For the sake of brevity, details are not repeated here.

Optionally, the chip can be applied to the mobile terminal/terminal device in the embodiments of the present application, and the chip can implement the corresponding processes implemented by the mobile terminal/terminal device in the various methods of the embodiments of the present application. For the sake of brevity, details are not repeated here.

It should be understood that the chip mentioned in the embodiment of the present application may also be called a system level chip, a system chip, a chip system, or a system-on-chip.

Figure 19:
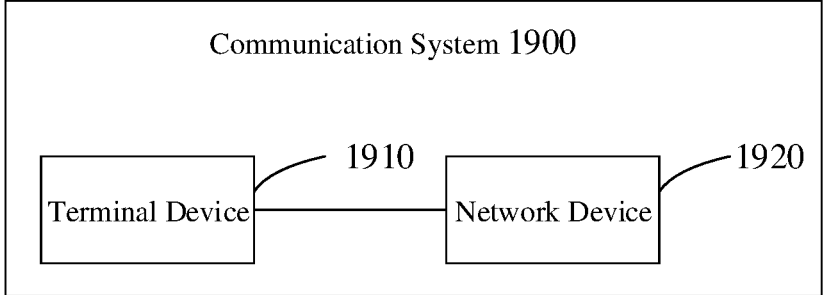
FIG. 19 is a schematic block diagram of a communication system provided by an embodiment of the present application.

FIG. 19 is a schematic block diagram of a communication system 1900 provided by an embodiment of the present application. As shown in FIG. 19, the communication system 1900 includes a terminal device 1910 and a network device 1920.

In the embodiment, the terminal device 1910 can be used to realize the corresponding functions realized by the terminal device in the above method, and the network device 1920 can be used to realize the corresponding functions realized by the network device in the above method.

It should be understood that, the processor of this embodiment of this application may be an integrated circuit chip, and has a signal processing capability. In an implementation process, steps in the foregoing method embodiments can be implemented by using a hardware integrated logical circuit in the processor or by using instructions in a form of software. The processor may be a general-purpose processor, a digital signal processor (DSP), an application-specific integrated circuit (ASIC), a field-programmable gate array (FPGA), another programmable logic device, a discrete gate or a transistor logic device, or a discrete hardware component. The processor may implement or perform methods, steps and logical block diagrams disclosed in this embodiment of this application. The general purpose processor may be a microprocessor or the processor may be any conventional processor or the like. The steps of the methods disclosed with reference to the embodiments of this application may be directly performed and completed by using a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the methods in combination with hardware thereof.

It can be understood that, the memory in this embodiment of this application may be a volatile memory or a nonvolatile memory, or may include both a volatile memory and a non-volatile memory. The non-volatile memory may be a read-only memory (ROM), a programmable ROM (PROM), an erasable programmable ROM (EPROM), an electrically EPROM (EEPROM), or a flash memory. The volatile memory may be a random access memory (RAM), and is used as an external cache. Through exemplary but not limitative description, RAMs in many forms may be used, for example, a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory for the system and the method described herein intends to include, but not limited to, the memories and any other suitable types of memories.

It should be understood that, the foregoing description of the memory is illustrative, but is not limitative. For example, the memory in the embodiments of this application may be alternatively a static RAM (SRAM), a dynamic RAM (DRAM), a synchronous DRAM (SDRAM), a double data rate SDRAM (DDR SDRAM), an enhanced SDRAM (ES-DRAM), a synchlink SDRAM (SLDRAM), a direct rambus RAM (DR RAM), or the like. That is, the memory described in this embodiment of this application intends to include, but not limited to, the memories and any other suitable types of memories.

An embodiment of this application further provides a computer-readable storage medium, configured to store a computer program.

Optionally, the computer-readable storage medium may be applied to the network device in the embodiments of this application, and the computer program causes a computer to implement corresponding procedures implemented by the network device in the methods in the embodiments of this application. For brevity, details are not described herein again.

Optionally, the computer-readable storage medium may be applied to the mobile terminal/terminal device in the embodiments of this application, and the computer program causes a computer to implement corresponding procedures implemented by the mobile terminal/terminal device in the methods in the embodiments of this application. For brevity, details are not described herein again.

An embodiment of this application further provides a computer program product, including a computer program instruction.

Optionally, the computer program product may be applied to the network device in the embodiments of this application, and the computer program instruction causes a computer to implement corresponding procedures implemented by the network device in the methods in the embodiments of this application. For brevity, details are not described herein again.

Optionally, the computer program product may be applied to the mobile terminal/terminal device in the embodiments of this application, and the computer program instruction causes a computer to implement corresponding procedures implemented by the mobile terminal/terminal device in various methods in the embodiments of this application. For brevity, details are not described herein again.

An embodiment of this application further provides a computer program.

Optionally, the computer program may be applied to the network device in the embodiments of this application, and when run on a computer, the computer program causes the computer to implement corresponding procedures implemented by the network device in the methods in the embodiments of this application. For brevity, details are not described herein again.

Optionally, the computer program may be applied to the mobile terminal/terminal device in the embodiments of this application, and when run on the computer, the computer program causes the computer to implement corresponding procedures implemented by the mobile terminal/terminal device in the methods in the embodiments of this application. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the method embodiments of this application. The foregoing storage medium includes: any medium that can store program code, such as a universal serial bus (USB) flash disk, a removable hard disk, a ROM, a RAM, a magnetic disk, or an optical disc.

The descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multicast broadcast service MBS service transmission method, comprising:

determining, by a terminal device, a corresponding relationship between a physical downlink control channel PDCCH opportunity and a synchronization signal block SSB index, wherein the PDCCH opportunity is used to transmit an MBS PDCCH; and receiving, by the terminal device, the MBS PDCCH based on the correspondence between the PDCCH opportunity and the SSB index, wherein the method further comprises: acquiring, by the terminal device, first configuration information, wherein the first configuration information is used to determine a first time window; wherein, within the first time window, the PDCCH opportunity corresponding to the MBS service is numbered from 0, wherein, for an n-th MBS data in the first time window, an index of the PDCCH opportunity corresponding to a k-th actually transmitted SSB is:

$$(n-1)*S+(k-1);$$

wherein, n is a positive integer greater than or equal to 1 and less than or equal to N, k is a positive integer greater than or equal to 1 and less than or equal to S: S is a number of SSBs actually transmitted, and N is a number of MBS data transmitted within the first time window, wherein the MBS data has H repeated transmissions, and H is a positive integer; for an h-th repeated transmission of the n-th MBS data in the first time window, the index of the PDCCH opportunity corresponding to the k-th actually transmitted SSB is:

$$(n-1)*S*H+S*(h-1)+(k-1);$$

wherein, h is a positive integer greater than or equal to 1 and less than or equal to H, and wherein a value of N satisfies the following formula: N=floor (total number of PDCCH opportunities in the first time window/(S*H)), wherein floor represents a rounding down operation.

2. The method according to claim 1, wherein the first configuration information comprises first indication information and second indication information, the first indication information is used to determine a length and/or a cycle of the first time window, and the second indication information is used to determine a starting position of the first time window.

3. The method according to claim 1, wherein, the first configuration information is protocol defined; or, the first configuration information is configured by a network device through a multicast control channel MCCH; or, the first configuration information is configured by the network device through a system broadcast message.

4. The method according to claim 1, wherein, a value of N satisfies the following formula: N=floor (the total number of PDCCH opportunities in the first time window/S), and floor represents a rounding down operation; or, the value of N is configured by a network device.

5. A terminal device, comprising: a processor and a memory, the memory is used to store a computer program, the processor is used to invoke and run the computer program stored in the memory, to cause the terminal device to perform:

determining a corresponding relationship between a physical downlink control channel PDCCH opportunity and a synchronization signal block SSB index, wherein the PDCCH opportunity is used to transmit an MBS PDCCH; and receiving the MBS PDCCH based on the correspondence between the PDCCH opportunity and the SSB index, wherein the execution causes the terminal device to:

acquire first configuration information, wherein the first configuration information is used to determine a first time window; wherein, within the first time window, the PDCCH opportunity corresponding to the MBS service is numbered from 0, wherein, for an n-th MBS data in the first time window, an index of the PDCCH opportunity corresponding to a k-th actually transmitted SSB is:

$$(n-1)*S+(k-1);$$

wherein, n is a positive integer greater than or equal to 1 and less than or equal to N, k is a positive integer greater than or equal to 1 and less than or equal to S; S is a number of SSBs actually transmitted, and N is a number of MBS data transmitted within the first time window, wherein the MBS data has H repeated transmissions, and H is a positive integer; for an h-th repeated transmission of the n-th MBS data in the first time window, the index of the PDCCH opportunity corresponding to the k-th actually transmitted SSB is:

$$(n-1)*S*H+S*(h-1)+(k-1);$$

wherein, h is a positive integer greater than or equal to 1 and less than or equal to H, and wherein a value of N satisfies the following formula: N=floor (total number of PDCCH opportunities in the first time window/(S*H)), wherein floor represents a rounding down operation.

6. The terminal device according to claim 5, wherein the first configuration information comprises first indication information and second indication information, the first indication information is used to determine a length and/or a cycle of the first time window, and the second indication information is used to determine a starting position of the first time window.

7. The terminal device according to claim 5, wherein, the first configuration information is protocol defined; or, the first configuration information is configured by a network device through a multicast control channel MCCH; or, the first configuration information is configured by the network device through a system broadcast message.

8. The terminal device according to claim 5, wherein, a value of N satisfies the following formula: N=floor (the total number of PDCCH opportunities in the first time window/S), and floor represents a rounding down operation; or, the value of N is configured by a network device.

9. A multicast broadcast service MBS service transmission method, comprising:

determining, by a terminal device, a corresponding relationship between a physical downlink control channel PDCCH opportunity and a synchronization signal block SSB index, wherein the PDCCH opportunity is used to transmit an MBS PDCCH; and receiving, by the terminal device, the MBS PDCCH based on the correspondence between the PDCCH opportunity and the SSB index, wherein the method further comprises: acquiring, by the terminal device, first configuration information, wherein the first configuration information is used to determine a first time window; wherein, within the first time window, the PDCCH opportunity corresponding to the MBS service is numbered from 0, wherein the method further comprises: receiving, by the terminal device, second configuration information or third configuration information sent by a network device, wherein the second configuration information is used to determine a PDCCH opportunity index list, the PDCCH opportunity index list comprises N PDCCH opportunity indexes, and N is a positive integer greater than 1; each PDCCH opportunity index in the N PDCCH opportunity indexes is used to indicate a first one PDCCH opportunity corresponding to one MBS data, and wherein the third configuration information is used to determine an MBS data interval, and the MBS data interval is used to indicate a number of PDCCH opportunities between two adjacent MBS data intervals;

in response to receiving the second configuration information, for the MBS data, an index of the PDCCH opportunity corresponding to a k-th actually transmitted SSB is: index of the first PDCCH opportunity corresponding to the MBS data+(k−1); wherein, k is a positive integer greater than or equal to 1 and less than or equal to S; and S is a number of SSBs actually transmitted, and in response to receiving the third configuration information, for an n-th MBS data in the first time window, an index of the PDCCH opportunity corresponding to a k-th actually transmitted SSB is: first PDCCH opportunity index+(n−1)*MBS data interval+(k−1); wherein, the first PDCCH opportunity index is used to indicate a first one PDCCH opportunity corresponding to the first one MBS data in the first time window, n is a positive integer greater than or equal to 1 and less than or equal to N, and k is a positive integer greater than or equal to 1 and less than or equal to S; S is a number of SSBs actually transmitted, and N is a number of MBS data transmitted in the first time window.

10. The method according to claim 9, wherein the MBS data has H repeated transmissions, and H is a positive integer;

in response to receiving the second configuration information, for an h-th repeated transmission of the MBS data, the index of the PDCCH opportunity corresponding to the k-th actually transmitted SSB is:

index of the first one PDCCH opportunity corresponding to the MBS data+S*(h−1)+(k−1); or index of the first PDCCH opportunity corresponding to the h-th repeated transmission of the MBS data+(k−1); wherein, h is a positive integer greater than or equal to 1 and less than or equal to H.

11. The method according to claim 10, wherein the index of the first one PDCCH opportunity corresponding to the h-th repeated transmission is configured by a network device.

12. The method according to claim 9, wherein, the first PDCCH opportunity index is configured by the network device; or, the first PDCCH opportunity index is 0 by default.

13. The method according to claim 9, wherein, a value of N satisfies the following formula: first PDCCH opportunity index+N*MBS data interval≤total number of PDCCH opportunities in the first time window−1; or, the value of N is configured by the network device.

14. The method according to claim 9, wherein the MBS data has H repeated transmissions, and H is a positive integer;

in response to receiving the third configuration information, for an h-th repeated transmission of the n-th MBS data in the first time window, the index of the PDCCH opportunity corresponding to the k-th actually transmitted SSB is:

first PDCCH opportunity index+(n−1)*MBS data interval+S*(h−1)+(k−1); or first PDCCH opportunity index+(n−1)*MBS transmission interval*H+(h−1)*MBS transmission interval+(k−1);

wherein, h is a positive integer greater than or equal to 1 and less than or equal to H.

15. The method according to claim 14, wherein, a value of N satisfies the following formula:

first PDCCH opportunity index+$N$*MBS data interval≤total number of PDCCH opportunities in the first time window−1; or the value of N satisfies the following formula:

first PDCCH opportunity index+$N$*MBS transmission interval*$H$≤total number of PDCCH opportunities in the first time window−1; or the value of N is configured by the network device.

16. The method according to claim 14, wherein the MBS transmission interval is used to indicate the number of PDCCH opportunities between two adjacent transmissions, and the two adjacent transmissions belong to two transmissions of a same MBS data or two transmission of different MBS data.

17. A terminal device, comprising: a processor and a memory, the memory is used to store a computer program, the processor is used to invoke and run the computer program stored in the memory, to cause the terminal device to perform steps of the method according to claim 9, wherein:

the MBS data has H repeated transmissions, and H is a positive integer;

in response to receiving the third configuration information, for an h-th repeated transmission of the n-th MBS data in the first time window, the index of the PDCCH opportunity corresponding to the k-th actually transmitted SSB is:

first PDCCH opportunity index+$(n−1)$*MBS data interval+$(h−1)$*MBS repetition interval+$(k−1)$;

wherein, h is a positive integer greater than or equal to 1 and less than or equal to H.

18. The terminal device according to claim 17, wherein, a value of N satisfies the following formula: first PDCCH opportunity index+N*MBS data interval≤total number of PDCCH opportunities in the first time window−1; or, the value of N is configured by the network device.

19. The terminal device according to claim 17, wherein the MBS repetition interval is used to indicate the number of PDCCH opportunities between two adjacent transmissions of the same MBS data.

20. The terminal device according to claim 19, wherein, a value of H is configured by a network device; or, the value of H is 1 by default.

* * * * *